(12) United States Patent
Sivertsen

(10) Patent No.: US 9,411,511 B1
(45) Date of Patent: Aug. 9, 2016

(54) THREE-DIMENSIONAL DISPLAY DEVICES WITH OUT-OF-SCREEN VIRTUAL KEYBOARDS

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 295 days.

(21) Appl. No.: 14/031,430

(22) Filed: Sep. 19, 2013

(51) Int. Cl.
   *G06F 3/01* (2006.01)
   *G06F 3/0488* (2013.01)

(52) U.S. Cl.
   CPC .................................. *G06F 3/04886* (2013.01)

(58) Field of Classification Search
   CPC .............................. G06T 15/00; G06F 3/011
   See application file for complete search history.

(56) References Cited

U.S. PATENT DOCUMENTS

| | | | | |
|---|---|---|---|---|
| 6,064,354 A * | 5/2000 | DeLuca | ................. | G02B 27/22 345/419 |
| 6,882,337 B2 | 4/2005 | Shetter | | |
| 8,253,713 B2 | 8/2012 | Soo et al. | | |
| 2006/0092170 A1 | 5/2006 | Bathiche et al. | | |
| 2008/0029316 A1 | 2/2008 | Jaeger et al. | | |
| 2008/0096651 A1 | 4/2008 | Okada | | |
| 2010/0261526 A1* | 10/2010 | Anderson | ............... | G06F 3/017 463/31 |
| 2011/0012841 A1 | 1/2011 | Lin | | |
| 2011/0084893 A1 | 4/2011 | Lee et al. | | |
| 2011/0234502 A1* | 9/2011 | Yun | ........................ | G06F 3/016 345/173 |
| 2012/0019528 A1* | 1/2012 | Ugawa | ................... | G09G 3/003 345/419 |
| 2012/0050154 A1* | 3/2012 | Jagmag | ................... | G06F 3/011 456/156 |
| 2012/0131453 A1* | 5/2012 | Pechanec | ................ | G06F 3/044 715/702 |
| 2012/0147000 A1* | 6/2012 | Song | .................. | H04N 13/0497 345/419 |
| 2012/0194512 A1* | 8/2012 | Kim | ...................... | G06T 15/503 345/419 |
| 2012/0256823 A1 | 10/2012 | Lee et al. | | |
| 2012/0256854 A1 | 10/2012 | Lee et al. | | |
| 2012/0256886 A1 | 10/2012 | Ryu et al. | | |
| 2013/0033440 A1 | 2/2013 | Cheng et al. | | |
| 2013/0050202 A1 | 2/2013 | Ueno et al. | | |
| 2013/0293534 A1 | 11/2013 | Sato et al. | | |
| 2013/0335648 A1 | 12/2013 | Kuroda | | |
| 2014/0111448 A1 | 4/2014 | Moses et al. | | |

* cited by examiner

*Primary Examiner* — Quan-Zhen Wang
*Assistant Examiner* — David Lee
(74) *Attorney, Agent, or Firm* — Locke Lord LLP; Tim Tingkang Xia, Esq.

(57) ABSTRACT

Certain aspects direct to a three-dimensional display device, which includes a display module defining a plurality of pixels, a barrier module, a sensing module, and a controller. For a viewer of the display module, the barrier module allows the viewer to perceives light emitted from the display module to form left-eye and right-eye views to form a three-dimensional virtual image. The sensing module generates sensing signals in response to detecting an object. The controller is configured to generate display signals for the display module to control the pixels, receive the sensing signals from the sensing module, and generate an object coordinate according to the sensing signals. In response to a display instruction, the controller controls the display module to display a three-dimensional virtual input device. In response to the object coordinate matching coordinates of an input region of the three-dimensional virtual input device, the controller generates an input command.

22 Claims, 19 Drawing Sheets

THREE-DIMENSIONAL DISPLAY DEVICES WITH OUT-OF-SCREEN VIRTUAL KEYBOARDS

FIELD

The present disclosure generally relates to three-dimensional display devices with out-of-screen virtual keyboards, and more particularly to three-dimensional display devices being capable of displaying out-of-screen virtual keyboards or other input devices and sensing user input of the virtual keyboards or input devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

With the rapid development of three-dimensional (3D) display technology, there has been increasing demands for three-dimensional display devices in a variety of application fields, including recreational, business and educational use. Traditionally, three-dimensional display may be achieved by using special 3D glasses. With modern technology, different technology may be used to display three-dimensional images viewable with naked eyes without the special 3D glasses. The 3D display technology may be utilized in any types of display devices, including televisions, desktop computer display devices, and portable devices such as laptops, smartphones and tablets.

In some occasions, the three-dimensional display devices may be used to display images that allow the viewers to perform interactive operations. Thus, there is a need for the three-dimensional display devices to allow the viewers to perform interactive operations in response to the three-dimensional image displayed.

Therefore, heretofore unaddressed needs still exist in the art to address the aforementioned deficiencies and inadequacies.

SUMMARY

Certain aspects of the present disclosure direct to a three-dimensional display device. In certain embodiments, the three-dimensional display device includes: a display module defining a plurality of pixels in a pixel matrix, wherein the pixels include a first set of pixels and a second set of pixels; a barrier module disposed at a viewer side of the display module, wherein for a viewer at the viewer side, the barrier module is configured to allow light emitted from the first set of pixels to be viewable only by a left eye of the viewer, and allow light emitted from the second set of pixels to be viewable only by a right eye of the viewer, such that the viewer perceives the light emitted from the first set of pixels as a left-eye view and the light emitted from the second set of pixels as a right-eye view, and perceives the left-eye view and the right view to form a three-dimensional virtual image between the viewer and the display module; a sensing module configured to detect an object at the viewer side of the three-dimensional display device, and to generate sensing signals in response to detecting the object; and a controller electrically connected to the display module and the sensing module. The controller includes a processor and a non-volatile memory storing computer executable codes. The codes, when executed at the processor, are configured to: generate display signals, and send the display signals to the display module to control the pixels; receive the sensing signals from the sensing module, and generate an object coordinate according to the sensing signals; in response to a display instruction, generate the display signals for an out-of-screen three-dimensional virtual input device, wherein the display signals are configured to control the first set of pixels to display the left-eye view of the three-dimensional virtual input device, and to control the second set of pixels to display the right-eye view of the three-dimensional virtual input device; and in response to the object coordinate matching coordinates of an input region of the three-dimensional virtual input device, generate an input command.

In certain embodiments, the codes include: a pixel control module configured to generate the display signals in response to a plurality of image signals, and send the display signals respectively to the display module to control the pixels; an image processing module configured to generate the image signals from an image; and a sensing control module configured to generate scan signals for the sensing module, receive the sensing signals from the sensing module, and generate the object coordinate by comparing to the sensing signals. When the image corresponds to the three-dimensional virtual input device, the pixel control module generates the display signals to control the first set of pixels to display the left-eye view of the three-dimensional virtual input device, and to control the second set of pixels to display the right-eye view of the three-dimensional virtual input device.

In certain embodiments, the sensing module includes a plurality of capacitive sensing units in a capacitive matrix. Each of the capacitive sensing units is configured to receive one of the scan signals generated by the sensing control module, to generate the sensing signal in response to the scan signal, and to send the sensing signal to the sensing control module.

In certain embodiments, the capacitive sensing units are capacitive sensor electrodes. Each of the capacitive sensor electrodes is configured to induce a capacitance change when the object exists within a predetermined range of the capacitive sensor electrode.

In certain embodiments, the capacitive sensing units are capacitive micromachined ultrasonic transducer (CMUT) arrays, and each of the CMUT arrays includes a plurality of CMUT units. Each of the CMUT arrays is configured to transmit ultrasonic waves and to receive refracted ultrasonic waves by the objects.

In certain embodiments, the virtual input device includes an out-of-screen three-dimensional virtual keyboard.

In certain embodiments, the display signals include a plurality of scan signals and a plurality of data signals.

In certain embodiments, the display module includes: a scan driver electrically connected to the controller, configured to receive the scan signals from the controller; a data driver electrically connected to the controller, configured to receive the data signals from the controller; a plurality of scan lines electrically connected to the scan driver, each scan line configured to receive one of the scan signals from the scan driver; and a plurality of data lines electrically connected to the data driver, each data line configured to receive one of the data signals from the data driver. The scan lines and data lines cross over to define the plurality of pixels.

In certain embodiments, the barrier module is a parallax barrier layer, which includes a plurality of transparent units and a plurality of opaque units alternatively positioned.

In certain embodiments, the three-dimensional display device is switchable between a two-dimensional display mode and a three-dimensional display mode. In certain embodiments, the codes include: a barrier control module configured to control the opaque units of the barrier module to switch between a transparent state and an opaque state. When the opaque units are switched to the transparent state, the three-dimensional display device is switched to the two-dimensional display mode. When the opaque units are switched to the opaque state, the three-dimensional display device is switched to the three-dimensional display mode.

Certain aspects of the present disclosure direct to a controller, which includes a processor and a non-volatile memory storing computer executable codes. The codes, when executed at the processor, are configured to: generate display signals for a display module defining a plurality of pixels in a pixel matrix, and send the display signals to the display module to control the pixels, wherein the pixels include a first set of pixels and a second set of pixels, and wherein a barrier module is disposed at a viewer side of the display module, wherein for a viewer at the viewer side, the barrier module is configured to allow light emitted from the first set of pixels to be viewable only by a left eye of the viewer, and allow light emitted from the second set of pixels to be viewable only by a right eye of the viewer, such that the viewer perceives the light emitted from the first set of pixels as a left-eye view and the light emitted from the second set of pixels as a right-eye view, and perceives the left-eye view and the right view to form a three-dimensional virtual image between the viewer and the display module; receive sensing signals from a sensing module, and generate an object coordinate according to the sensing signals, wherein the sensing module is configured to detect an object at the viewer side of the display module, and to generate the sensing signals in response to detecting the object; in response to a display instruction, generate the display signals for an out-of-screen three-dimensional virtual input device, wherein the display signals are configured to control the first set of pixels to display the left-eye view of the three-dimensional virtual input device, and to control the second set of pixels to display the right-eye view of the three-dimensional virtual input device; and in response to the object coordinate matching coordinates of a input region of the three-dimensional virtual input device, generate an input command.

In certain embodiments, the codes include: a pixel control module configured to generate the display signals in response to a plurality of image signals, and send the display signals respectively to the display module to control the pixels; an image processing module configured to generate the image signals from an image; and a sensing control module configured to generate scan signals for the sensing module, receive the sensing signals from the sensing module, and generate the object coordinate by comparing to the sensing signals. When the image corresponds to the three-dimensional virtual input device, the pixel control module generates the display signals to control the first set of pixels to display the left-eye view of the three-dimensional virtual input device, and to control the second set of pixels to display the right-eye view of the three-dimensional virtual input device.

In certain embodiments, the virtual input device includes an out-of-screen three-dimensional virtual keyboard.

In certain embodiments, the display signals include a plurality of scan signals and a plurality of data signals.

In certain embodiments, the display module includes: a scan driver electrically connected to the controller, configured to receive the scan signals from the controller; a data driver electrically connected to the controller, configured to receive the data signals from the controller; a plurality of scan lines electrically connected to the scan driver, each scan line configured to receive one of the scan signals from the scan driver; and a plurality of data lines electrically connected to the data driver, each data line configured to receive one of the data signals from the data driver. The scan lines and data lines cross over to define the plurality of pixels.

In certain embodiments, the barrier module is a parallax barrier layer, which includes a plurality of transparent units and a plurality of opaque units alternatively positioned.

In certain embodiments, the codes include: a barrier control module configured to control the opaque units of the barrier module to switch between a transparent state and an opaque state. When the opaque units are switched to the transparent state, the display module is switched to the two-dimensional display mode. When the opaque units are switched to the opaque state, the display module is switched to the three-dimensional display mode.

Certain aspects of the present disclosure direct to a non-transitory computer readable medium storing computer executable codes. The codes, when executed at a processor, are configured to: generate display signals for a display module defining a plurality of pixels in a pixel matrix, and send the display signals to the display module to control the pixels, wherein the pixels include a first set of pixels and a second set of pixels, and wherein a barrier module is disposed at a viewer side of the display module, wherein for a viewer at the viewer side, the barrier module is configured to allow light emitted from the first set of pixels to be viewable only by a left eye of the viewer, and allow light emitted from the second set of pixels to be viewable only by a right eye of the viewer, such that the viewer perceives the light emitted from the first set of pixels as a left-eye view and the light emitted from the second set of pixels as a right-eye view, and perceives the left-eye view and the right view to form a three-dimensional virtual image between the viewer and the display module; receive sensing signals from a sensing module, and generate an object coordinate according to the sensing signals, wherein the sensing module is configured to detect an object at the viewer side of the display module, and to generate the sensing signals in response to detecting the object; in response to a display instruction, generate the display signals for an out-of-screen three-dimensional virtual input device, wherein the display signals are configured to control the first set of pixels to display the left-eye view of the three-dimensional virtual input device, and to control the second set of pixels to display the right-eye view of the three-dimensional virtual input device; and in response to the object coordinate matching coordinates of a input region of the three-dimensional virtual input device, generate an input command.

In certain embodiments, the codes include: a pixel control module configured to generate the display signals in response to a plurality of image signals, and send the display signals respectively to the display module to control the pixels; an image processing module configured to generate the image signals from an image; and a sensing control module configured to generate scan signals for the sensing module, receive the sensing signals from the sensing module, and generate the object coordinate by comparing to the sensing signals. When the image corresponds to the three-dimensional virtual input device, the pixel control module generates the display signals to control the first set of pixels to display the left-eye view of the three-dimensional virtual input device, and to control the second set of pixels to display the right-eye view of the three-dimensional virtual input device.

In certain embodiments, the virtual input device includes an out-of-screen three-dimensional virtual keyboard.

In certain embodiments, the display signals include a plurality of scan signals and a plurality of data signals.

In certain embodiments, the display module includes: a scan driver electrically connected to the controller, configured to receive the scan signals from the controller; a data driver electrically connected to the controller, configured to receive the data signals from the controller; a plurality of scan lines electrically connected to the scan driver, each scan line configured to receive one of the scan signals from the scan driver; and a plurality of data lines electrically connected to the data driver, each data line configured to receive one of the data signals from the data driver. The scan lines and data lines cross over to define the plurality of pixels.

In certain embodiments, the barrier module is a parallax barrier layer, which includes a plurality of transparent units and a plurality of opaque units alternatively positioned.

In certain embodiments, the codes include: a barrier control module configured to control the opaque units of the barrier module to switch between a transparent state and an opaque state. When the opaque units are switched to the transparent state, the display module is switched to the two-dimensional display mode. When the opaque units are switched to the opaque state, the display module is switched to the three-dimensional display mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
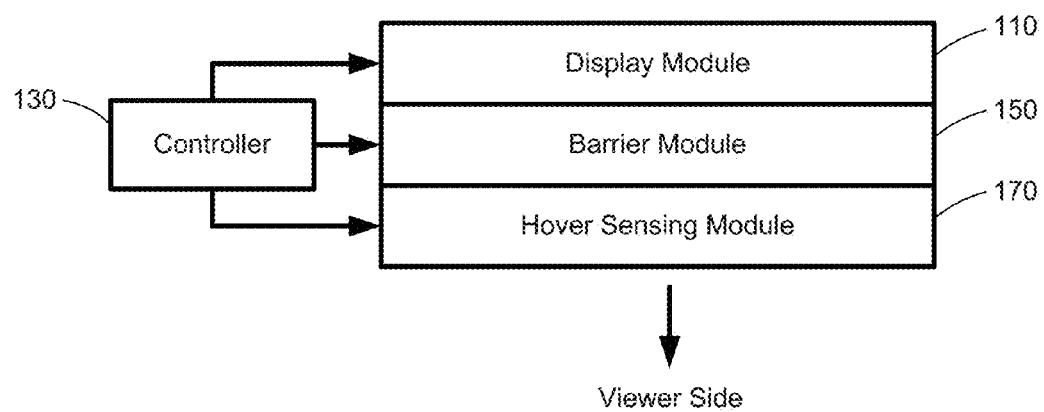
FIG. 1A schematically depicts a three-dimensional display device according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used.

Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1B:
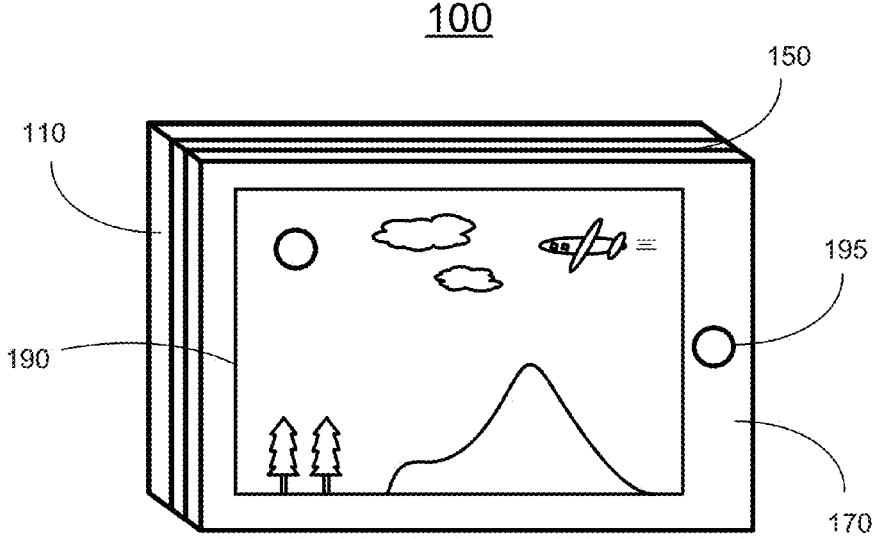
FIG. 1B schematically depicts the assembly of the three-dimensional display device according to one embodiment of the present disclosure.

FIGS. 1A and 1B schematically depict a three-dimensional display device according to one embodiment of the present disclosure. In certain embodiments, the three-dimensional display device 100 may be a touch screen display panel having the capability of displaying three-dimensional images and sensing the touching and hovering actions. In certain embodiments, the three-dimensional display device 100 may be a display device for an electronic device, such as a digital television, a computer, a laptop, a smartphone, a tablet, or any other types of electronic devices.

As shown in FIG. 1A, the three-dimensional display device 100 includes a display module 110, a controller 130, a barrier module 150, and a hover sensing module 170. In certain embodiments, the three-dimensional display device 100 includes a button 195. The barrier module 150 is disposed at a viewer side of the display module 110. The controller 130 is electrically connected to the display module 110, the barrier module 150 and the hover sensing module 170, respectively. In certain embodiments, the three-dimensional display device 100 is an in-cell hover sensing display device, where the display module 110, the barrier module 150 and the hover sensing module 170 may be integrated into one panel instead of stacking up in separate layers. In certain embodiments, the display module 110, the barrier module 150 and the hover sensing module 170 may be separate layers, and are respectively attached together to form a layered structure. For example, FIG. 1B shows a layered structure of the three-dimensional display device 100, where the barrier module 150 and the hover sensing module 170 are layered structures attached to the display module 110. The barrier module 150 is attached on a surface of the display module 110, and the hover sensing module 170 is attached on the barrier module 150. In certain embodiments, the display module 110 has a viewable region 190 for displaying the image, and the barrier module 150 and the hover sensing module 170 can be at least partially transparent for a viewer to see the viewable region 190 through the barrier module 150 and the hover sensing module 170. Although not explicitly shown in FIG. 1A or 1B, the three-dimensional display device 100 may include other peripheral devices or structures.

As shown in FIG. 1B, the viewable region 190 of the display module 170 is displaying a two-dimensional image. When the viewer needs to input texts or commands, the viewer may perform an action (e.g., by pressing the button 195) to trigger a virtual input device, and the three-dimensional display device 100 shows the virtual input device for the viewer to input the texts or commands. In certain embodiments, the virtual input device may be a virtual keyboard.

Figure 1C:
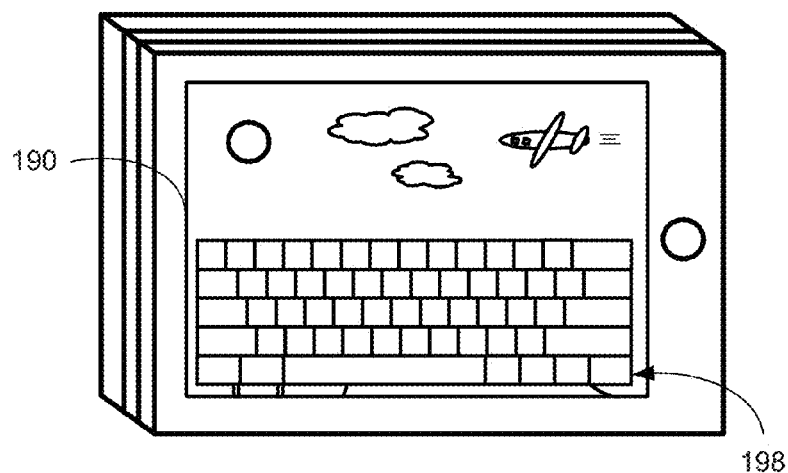
FIG. 1C schematically depicts the three-dimensional display device displaying a two-dimensional on-screen keyboard according to one embodiment of the present disclosure.
Figure 1D:
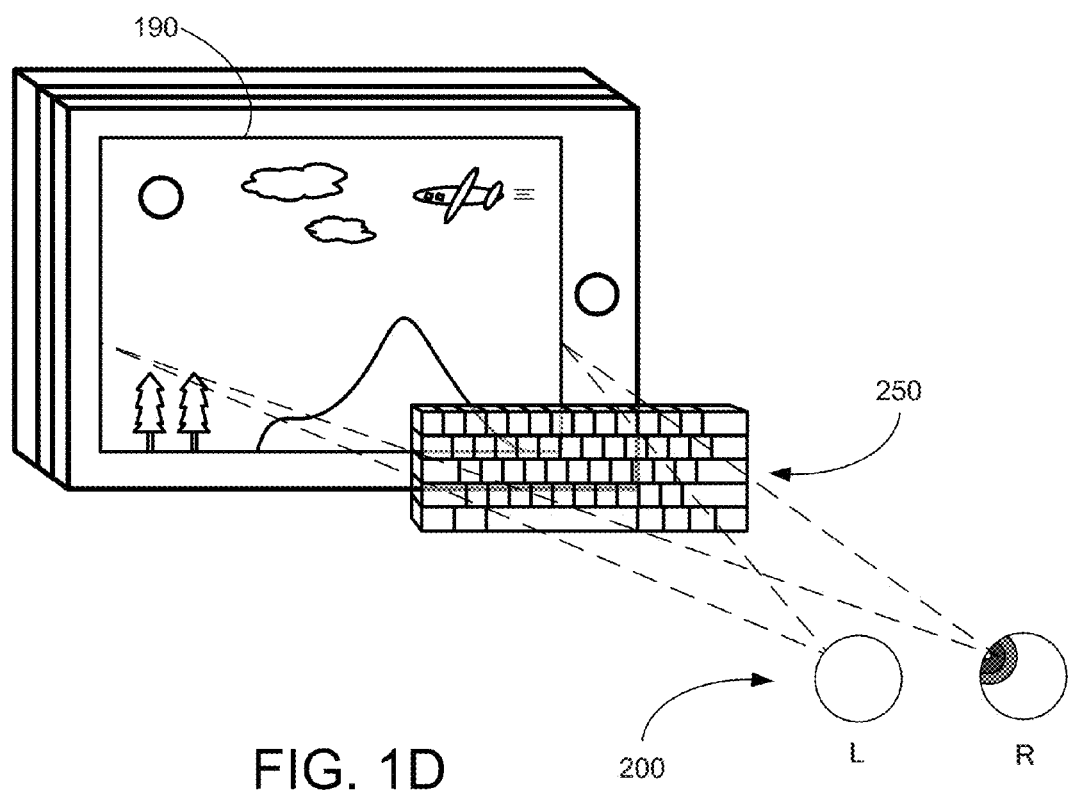
FIG. 1D schematically depicts the three-dimensional display device displaying a three-dimensional virtual keyboard according to one embodiment of the present disclosure.

FIGS. 1C and 1D shows two types of virtual keyboards. As shown in FIG. 1C, the three-dimensional display device 100 may show a two-dimensional on-screen keyboard 198 in the viewable region 190. The viewer may use a finger to press or to touch a key of the two-dimensional on-screen keyboard 198 to generate a key pressing command for inputting the text corresponding to the key. In certain embodiment, the two-dimensional on-screen keyboard 198 can be opaque to block the image behind the keyboard.

As shown in FIG. 1D, the three-dimensional display device 100 may display, in a three-dimensional display mode, a three-dimensional virtual keyboard 250 for the viewer, whose eyes are in an optimum viewable zone 200. The viewer may perceive the position of the three-dimensional virtual keyboard 250 at an out-of-screen visual layer or position. In other words, the viewer "sees" the three-dimensional virtual keyboard 250 floating in the air in front of the three-dimensional display device 100. In certain embodiment, the three-dimensional virtual keyboard 250 can be opaque to block the two-dimensional image displayed on the viewable region 190, or can be semi-transparent such that the viewer may see the two-dimensional image displayed on the viewable region 190 through the virtual keyboard. In this case, the viewer may use a finger, a pointer or any other objects to point in the air to the area corresponding to a certain key of the three-dimensional virtual keyboard 250 without touching the three-dimensional display device 100. When the three-dimensional display device 100 detects the object pointing at the key, the three-dimensional display device 100 converts the position of the object to a key pressing command for inputting the text corresponding to the key. Details of displaying the three-dimensional virtual keyboard 250 and detecting the object will be described herein The display module 110 is an image display panel of the three-dimensional display device 100, which is capable of displaying images. In certain embodiments, the display module 110 can be any type of display panels, such as liquid crystal displays (LCDs), light emitting diodes (LEDs), plasma displays, projector displays, or any other types of displays. In certain embodiments, the display module 110 may be a two-dimensional display panel, which does not have three-dimensional display capability. In certain embodiments, the display module 110 can be a color display which adopts a color model. For example, the display module 110 may adopt the RGB color model, which is configured to display a broad array of colors by mixing the three primary colors of red (R), green (G) and blue (B).

Figure 2A:
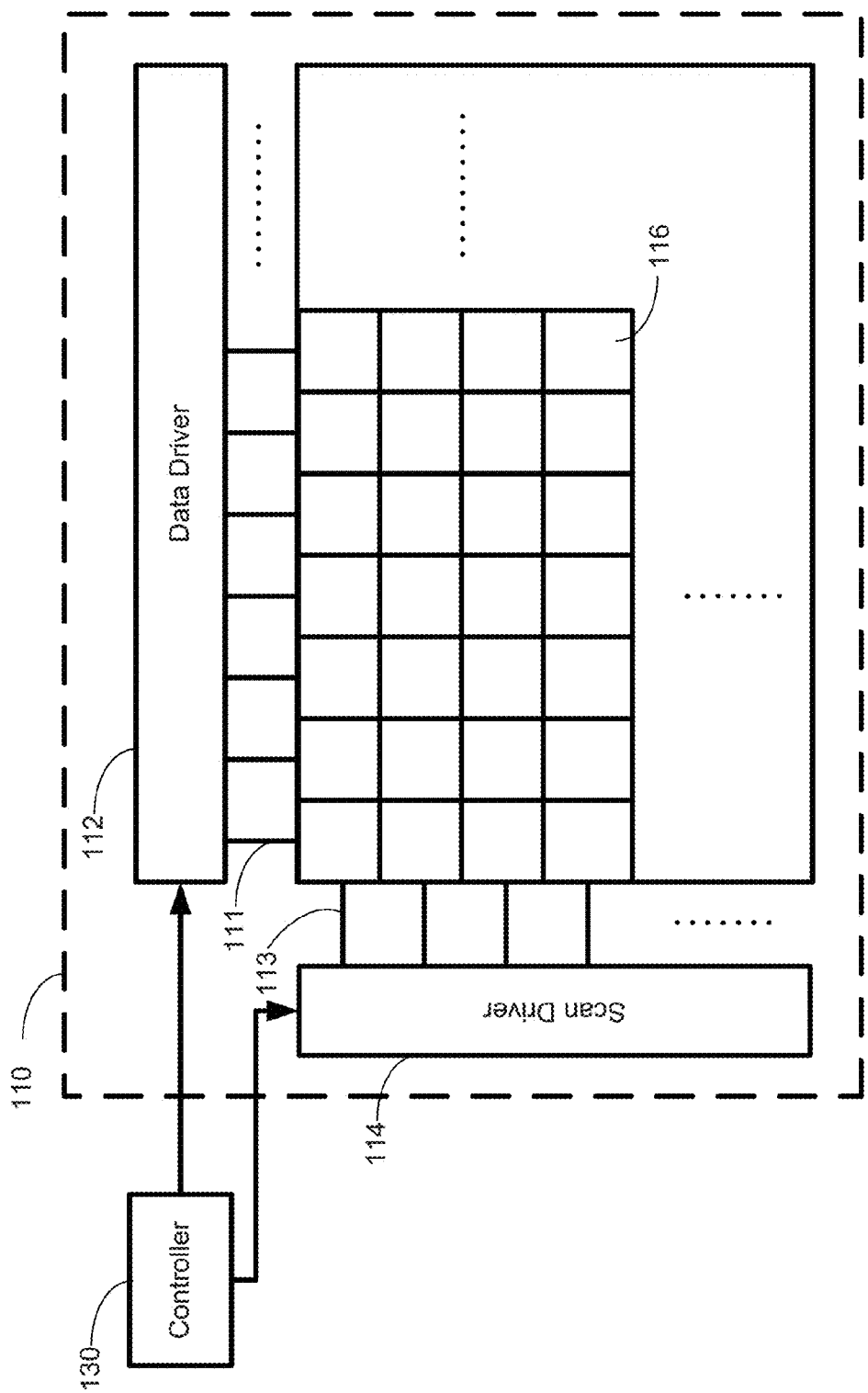
FIG. 2A schematically depicts one of the display panels of the display device according to one embodiment of the present disclosure.

FIG. 2A schematically depicts a display module according to one embodiment of the present disclosure. As shown in FIG. 2A, the display module 110 includes a data driver 112 and a scan driver 114 respectively connected to the controller 130 to receive data signals and scan signals. Further, a plurality of pixels 116 is defined on the display module 110 to form a pixel matrix. The data driver 112 is electrically connected to a plurality of data lines 111 to transmit the data signals to each of the pixels 116, and the scan driver 114 is electrically connected to a plurality of scan lines 113 to transmit the scan signals to each of the pixels 116. In other words, each pixel 116 is electrically connected to at least one data line 111 and at least one scan line 113. In certain embodiments, the pixel matrix may be formed by light-emitting elements (e.g., LED panels) without the need of using a backlight module. In certain embodiments, the display module 110 may include the backlight module as the light source for non-emitting pixel matrix (e.g., LCD panels).

Figure 2B:
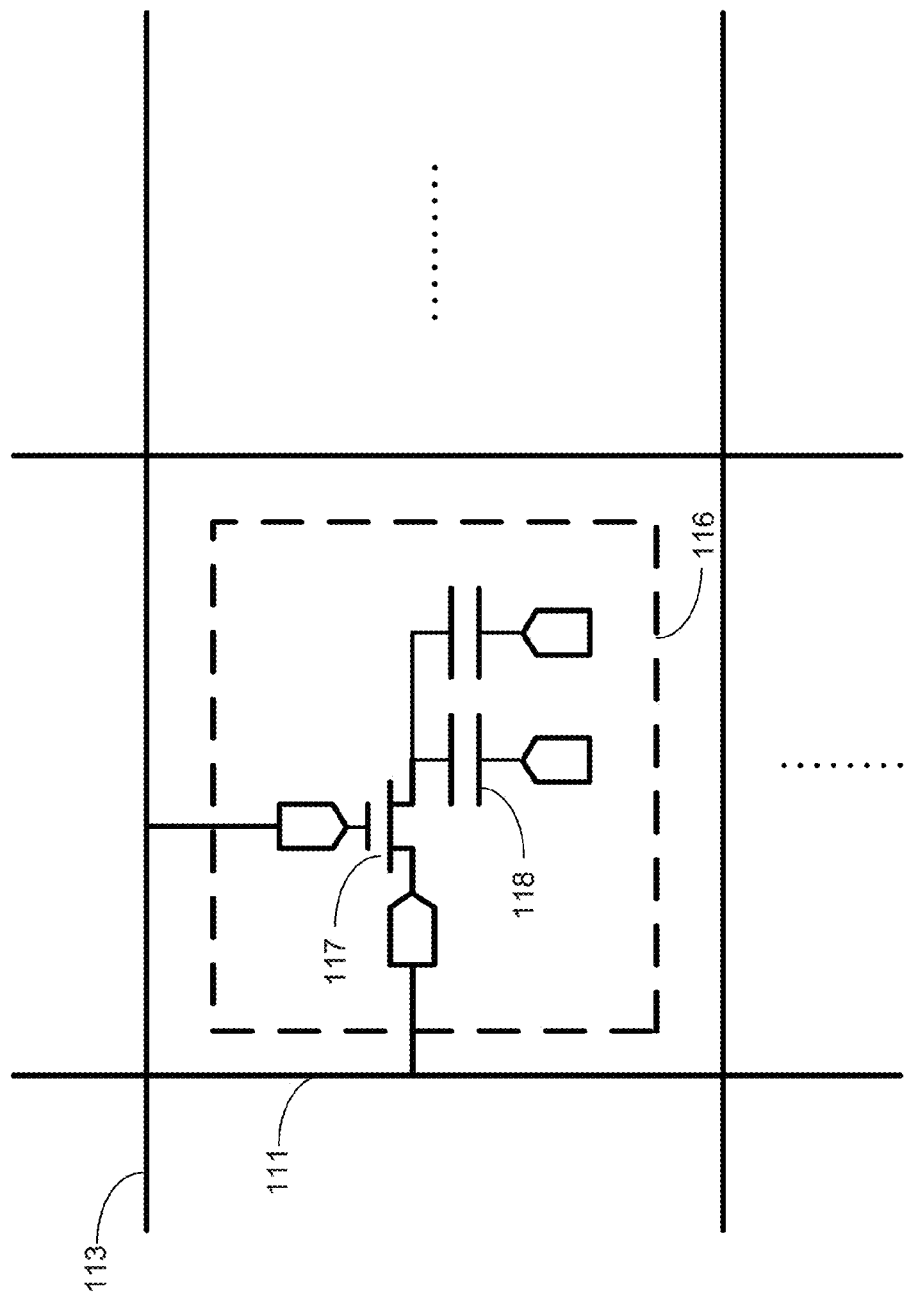
FIG. 2B schematically depicts a pixel according to one embodiment of the present disclosure.

FIG. 2B schematically depicts a pixel according to one embodiment of the present disclosure. As shown in FIG. 2B, a pixel 116 includes a pixel circuit, which is formed by a plurality of electronic elements, such as one or more thin-film transistors (TFTs) 117 and one or more capacitors 118. Interconnection of the electronic elements may vary according to different requirements of the pixel circuit. In certain embodiments, the TFT 117 serves as a switch. The source of the TFT 117 is connected to the data line 111 to receive the data signal, which controls the display of the pixel 116. The gate of the TFT 117 is connected to the scan line 113 to receive the scan signal, which controls the switch of the TFT 117. In certain embodiments, when the scan signal is at a high voltage level, the scan signal turns on the switch of the TFT 117 such that the data signal is transmittable from the source of the TFT 117 to the drain of the TFT 117. On the other hand, when the scan signal is at a low voltage level, the scan signal turns off the switch of the TFT 117, and the data signal is not transmittable to the drain of the TFT 117. Thus, by modulating the scan signals and the data signals, each pixel 116 may receive the corresponding data signal for displaying.

The barrier module 150 is a three-dimensional enabler layer for providing three-dimensional display capability for the display module 110. In certain embodiments, the barrier module 150 is a barrier film layer attached on the display module 110. To display three-dimensional images, the barrier module 150 is disposed at a viewer side of the display module 110, as shown in FIG. 1A. Thus, the barrier module 150 is positioned between the display module 110 and the viewer, and the light emitted by the display module 110 passes through the barrier module 150 to reach the eyes of the viewer.

The implementation of the three-dimensional display capability relates to the stereopsis impression of human eyes. The term "stereopsis" refers to three-dimensional appearances or sights. As human eyes are in different horizontal positions on the head, they present different views simultaneously. When both eyes simultaneously see an object within the sight, the two eyes perceive the two different views or images of the object along two non-parallel lines of sight. The human brain then processes with the two different views received by the two eyes to gain depth perception and estimate distances to the object.

Using the stereopsis concept, the barrier module 150 may be positioned to partially block or to refract light emitted from the pixels 116 of the display module 110, allowing each eye of the viewer to see the light emitted from a different set of pixels 116 of the display module 110. In other words, the viewer sees a left-eye view displayed by one set of pixels 116 by the left eye, and a right-eye view displayed by the other set of pixels 116 by the right eye. For example, for a pixel row, the left eye L receives the left-eye view only from the pixels 116 with odd numbers, and the right eye receives the right-eye view only from the pixels 116 with even numbers. When the left-eye view and the right-eye view are two offset images to correspondingly form a stereoscopic image, the brain of the viewer perceives the two offset images with the sense of depth, creating an illusion of the three-dimensional scene of the stereoscopic image. More precisely, the viewer "sees" the stereoscopic image as a virtual object since there is no actual object existing at the perceived location. Since the pixels 116 are divided into two sets to show the two offset images for the stereoscopic image, the resolution of the stereoscopic image is one half of the resolution of the display module 110.

In certain embodiments, the barrier module 150 may have a parallax structure. The parallax barrier module is a panel having a series of precision slits or transparent regions. By setting the positions of the precision slits or transparent regions, the parallax barrier module allows the two eyes of the viewer to respectively see the different sets of the pixels 116.

Figure 3A:
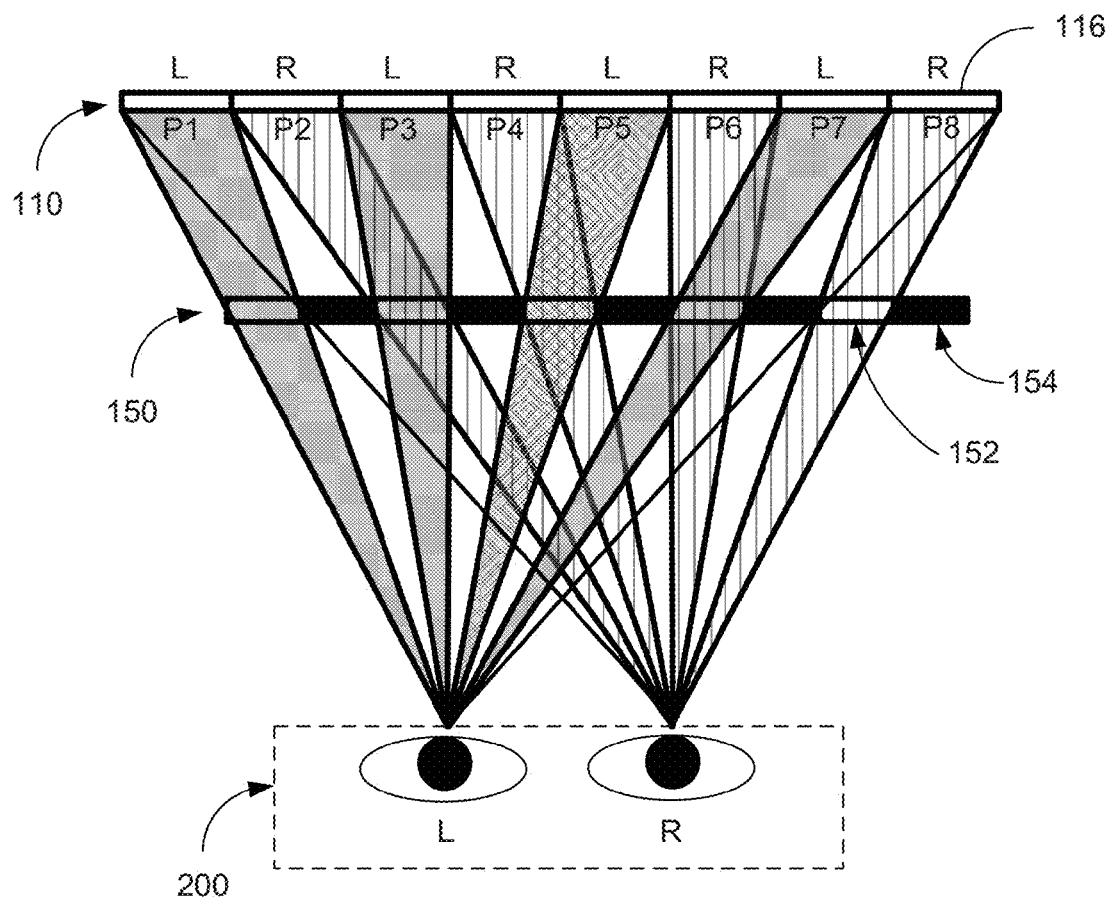
FIG. 3A schematically depicts a three-dimensional display device having a parallax barrier module according to one embodiment of the present disclosure.

FIG. 3A schematically depicts a three-dimensional display device having a parallax barrier module according to one embodiment of the present disclosure. As shown in FIG. 3A, the barrier module 150 has a plurality of barrier units, including transparent units 152 (shown as white blocks) and opaque units 154 (shown as black blocks) alternative positioned along a horizontal direction, which is parallel to the human eye alignment direction. Light emitted from the pixels 116 of the display module 110 may only pass through the transparent units 152 and not through the opaque units 154. Thus, the distance between the barrier module 150 and the display module 110 and the relative pitch size of the transparent regions 152 to the pixels 116 determine an optimum viewable zone 200 for the three-dimensional display device 100. For example, a viewer within the optimum viewable zone 200 may see one set of pixels 116 (P1, P3, P5, P7, etc.) with the left eye L, and the other set of pixels 116 (P2, P4, P6, P8, etc.) with the right eye R. In other words, the left eye L receives only the image signals corresponding to the pixels 116 with odd numbers (P1, P3, P5, P7 . . . ), and the right eye receives only the image signals corresponding to the pixels 116 with even numbers (P2, P4, P6, P8 . . . ).

In certain embodiments, the parallax barrier module 150 may be switchable between two-dimensional and three-dimensional display modes. For example, the opaque units 154 may be switchable between a transparent state and an opaque state. When the opaque units 154 are in the opaque state, a viewer may only see through the transparent units 152 and not through the opaque units 154, allowing the display device 100 to display three-dimensional images. On the other hand, when the opaque units 154 are switched to the transparent state, all barrier units of the barrier module 150 are transparent as if the barrier module 150 had not existed, and the viewer may see all the pixels 116 of the display module 110 with both eyes. In this case, the display device 100 may display two-dimensional images.

In certain embodiments, the barrier module 150 may have a lenticular structure. The lenticular barrier module is a panel having a series of lens. By setting the positions and curvatures of the lens, the lenticular barrier module allows the light emitted from the different sets of the pixels 116 to refract toward the two eyes of the viewer respectively, such that each eye sees one set of the pixels 116.

Figure 3B:
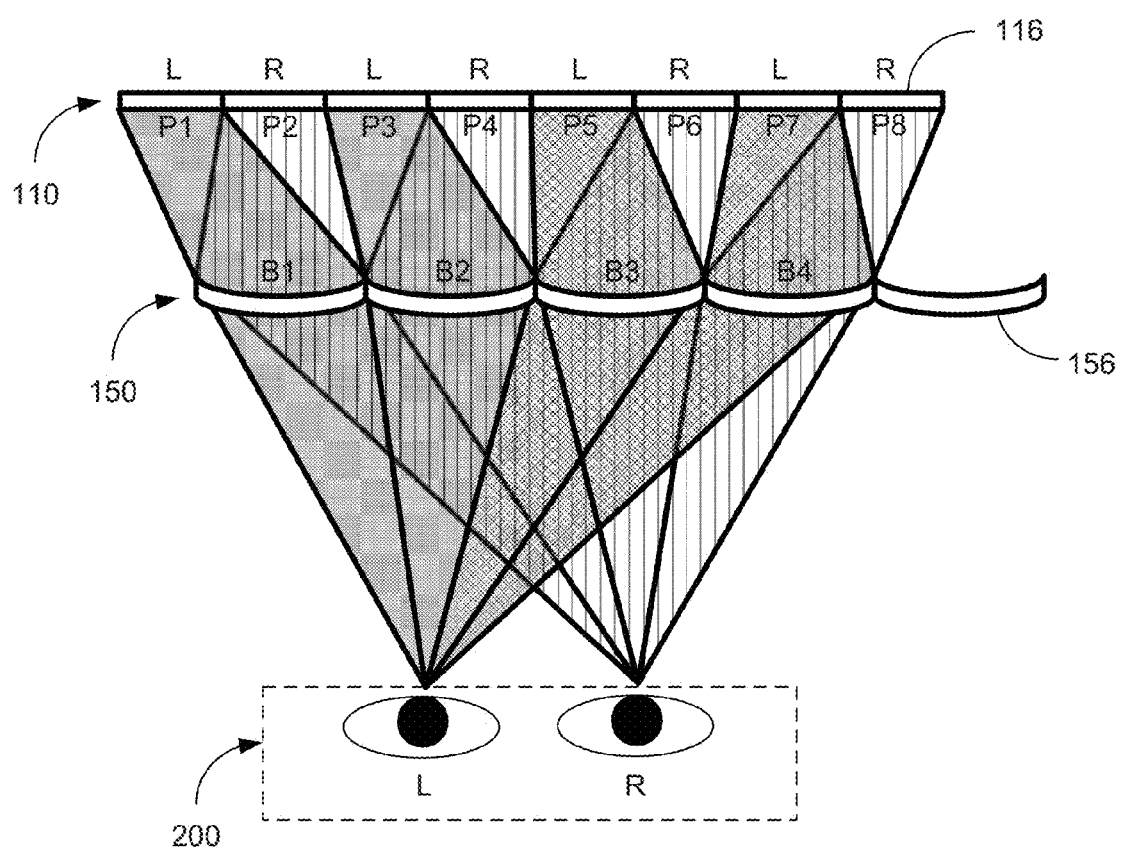
FIG. 3B schematically depicts a three-dimensional display device having a lenticular barrier module according to one embodiment of the present disclosure.

FIG. 3B schematically depicts a three-dimensional display device having a lenticular barrier module according to one embodiment of the present disclosure. As shown in FIG. 3B, the barrier module 150 has a plurality of lens units 156 positioned along the horizontal direction. Light emitted from the pixels 116 of the display module 110 may pass through and be refracted by each lens unit 156. Thus, the curvature of the lens units 156 and the relative size of the lens units 156 to the pixels 116 determine an optimum viewable zone 200 for the three-dimensional display device 100. For example, a viewer within the optimum viewable zone 200 may see one set of pixels 116 (P1, P3, P5, P7, etc.) with the left eye L, and the other set of pixels 116 (P2, P4, P6, P8, etc.) with the right eye R. In other words, the left eye L receives only the image signals corresponding to the pixels 116 with odd numbers (P1, P3, P5, P7 . . . ), and the right eye receives only the image signals corresponding to the pixels 116 with even numbers (P2, P4, P6, P8 . . . ).

As described above, when the viewer receives, with both eyes, two offset images to correspondingly form a stereoscopic image, the brain of the viewer perceives the two offset images with the sense of depth to create the illusion of a virtual object. The perception of depth relates to the offset distance of the two offset images. By increasing the offset distance of the two offset images, the brain perceives a decreased depth of the virtual object.

Figure 4A:
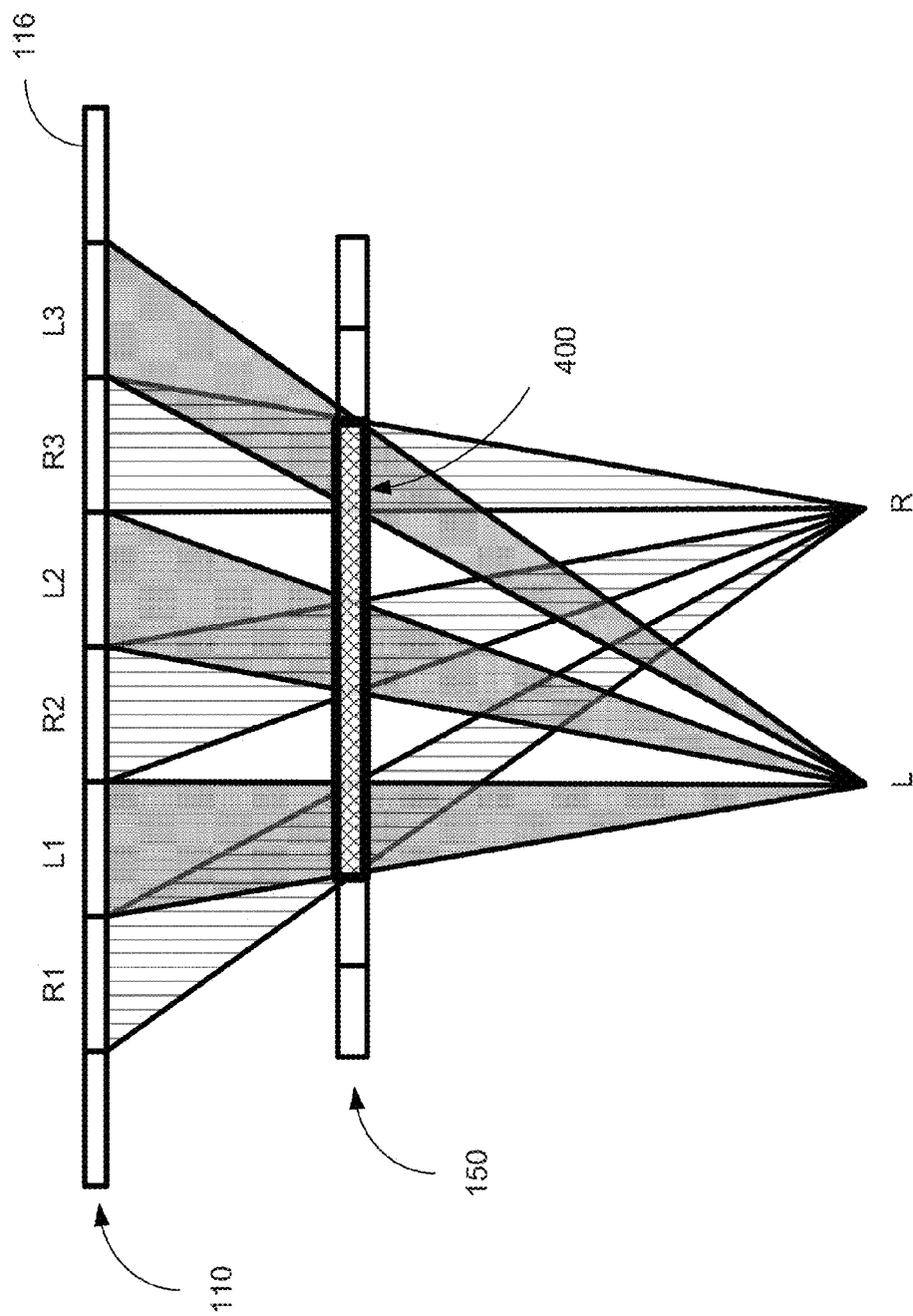
FIG. 4A schematically depicts depth perception of a virtual object with one-pixel offset according to one embodiment of the present disclosure.
Figure 4B:
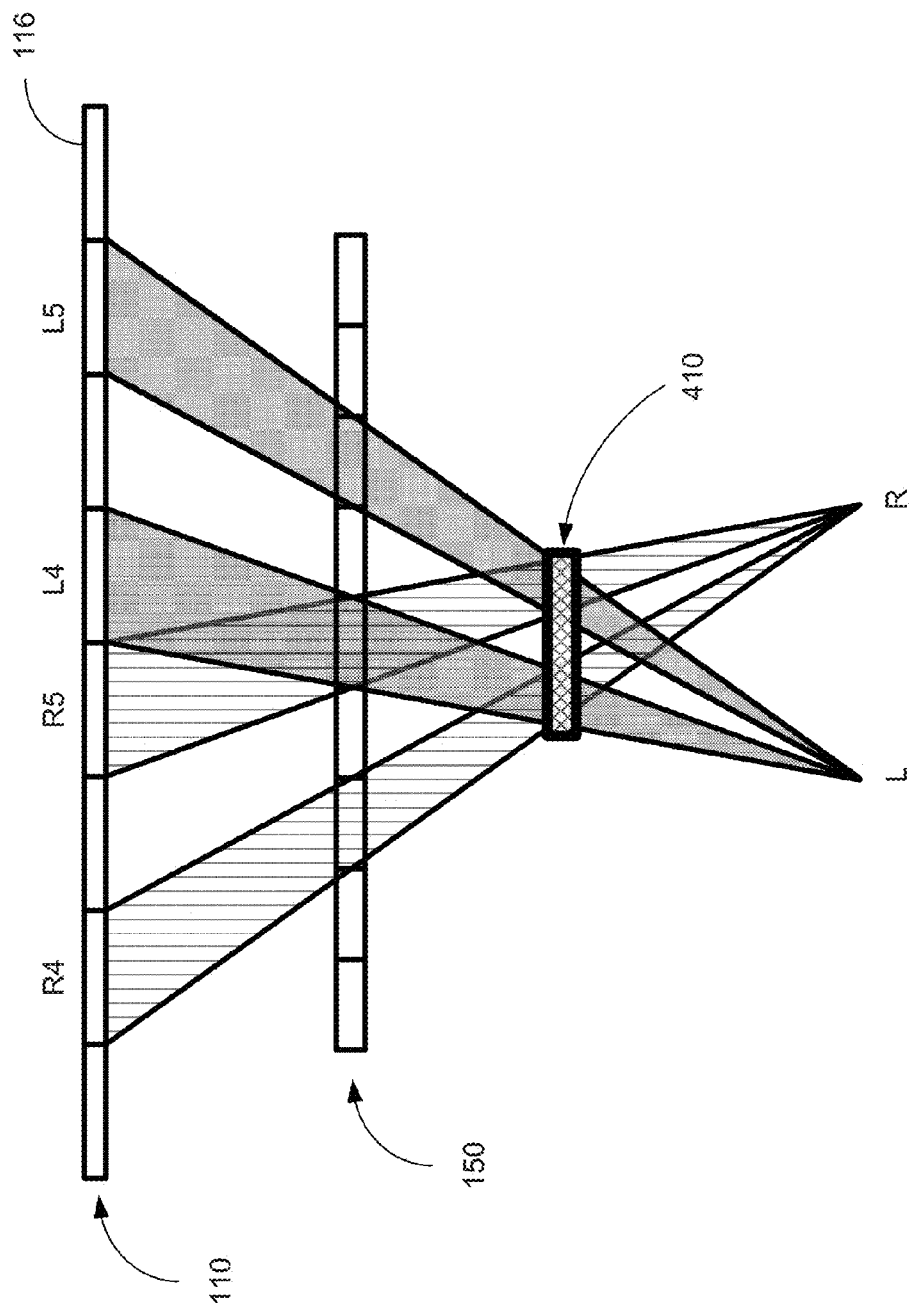
FIG. 4B schematically depicts depth perception of a virtual object with three-pixel offset according to one embodiment of the present disclosure.

FIGS. 4A and 4B use the three-dimensional display device having a parallax barrier module to depict two examples of depth perception of a virtual object with different pixel offset. As shown in FIG. 4A, for a viewer in the optimum viewable zone (eye positions shown as the letters L and R), the pixels 116 labeled (L1, L2, L3) provide the left-eye view, and the pixels labeled (R1, R2, R3) provide the right-eye view, forming a virtual object 400 having a width of three pixels 116. The pixel offset of the two offset images is the minimum one-pixel offset, with each pixel (L1, L2, L3) being one pixel away from the corresponding pixel (R1, R2, R3). In this case, the virtual object 400 is positioned right on the barrier module 150.

On the other hand, as shown in FIG. 4B, for a viewer in the optimum viewable zone (eye positions shown as the letters L and R), the pixels 116 labeled (L4, L5) provide the left-eye view, and the pixels 116 labeled (R4, R5) provide the right-eye view, forming a virtual object 410 having a width of two pixels 116. The pixel offset of the two offset images is a three-pixel offset, with each pixel (L4, L5) being three pixels away from the corresponding pixel (R4, R5). In this case, the viewer perceives the virtual object 410 to be "floated" out-of-screen from the barrier module 150, moving closer to the viewer. As shown in FIG. 4B, the position of the virtual object 410 may be calculated by the projections of the two offset images. In other words, the position of the virtual object 410 can be determined according to the pixel offset.

Figure 4C:
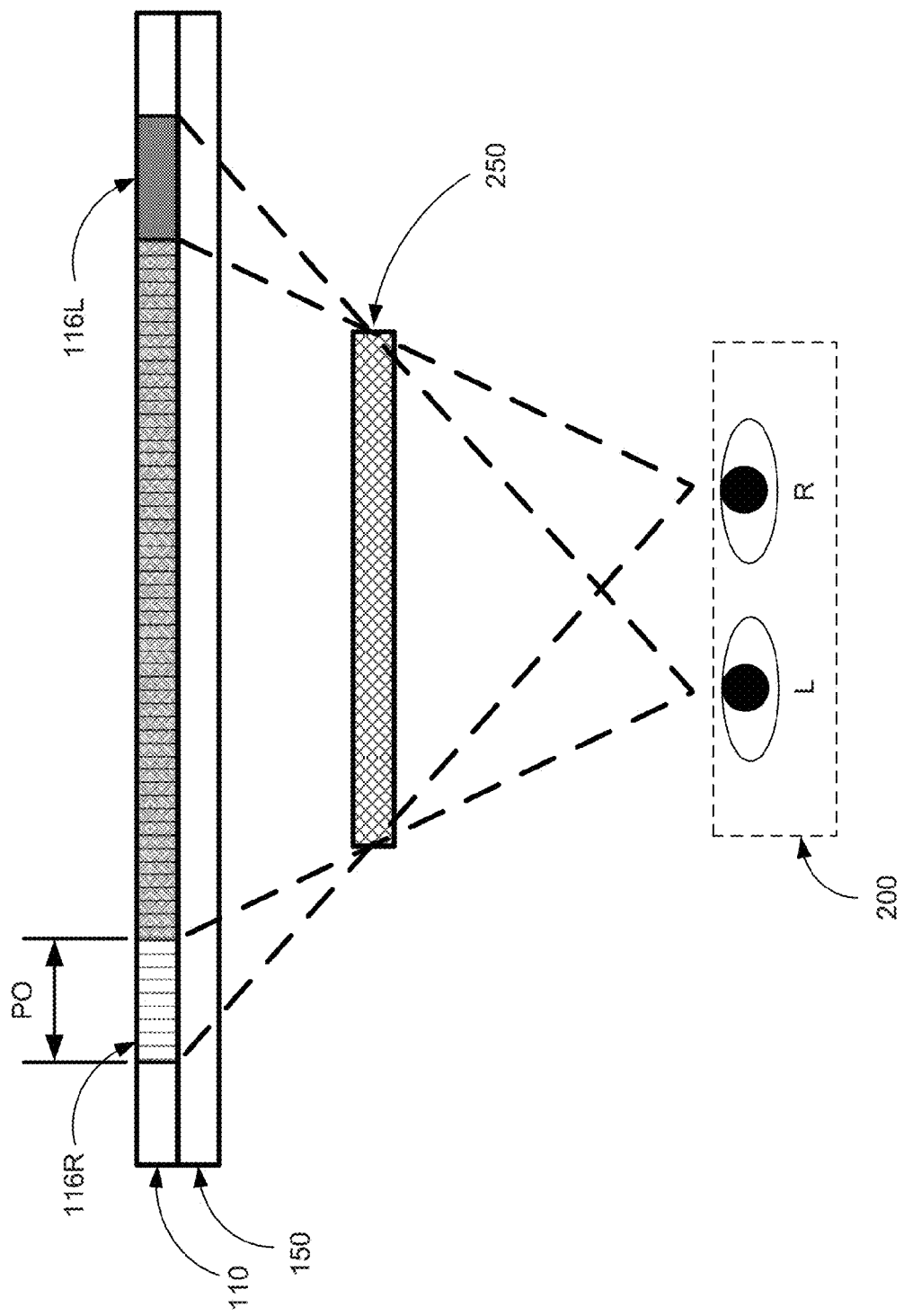
FIG. 4C schematically depicts the pixel offset of a three-dimensional virtual keyboard according to one embodiment of the present disclosure.

An example of the virtual object can be the three-dimensional virtual keyboard 250 as shown in FIG. 1D. FIG. 4C schematically depicts the pixel offset of the three-dimensional virtual keyboard according to one embodiment of the present disclosure. As shown in FIG. 4C, to display the three-dimensional virtual keyboard 250 at a predetermined out-of-screen position, the regions 116L and 116R for respectively displaying the left-eye view and the right-eye view can be obtained by projection, and the pixel offset PO can be determined by the pixel offset distance between the two regions 116L and 116R. Specifically, the pixels 116 corresponding to the left-eye view are the pixels 116 with odd numbers in the region 116L, and the pixels 116 corresponding to the right-eye view are the pixels 116 with even numbers in the region 116R. The pixel value for the each pixel within the two regions 116L and 116R are predetermined for displaying the three-dimensional virtual keyboard 250.

The hover sensing module 170 is a sensing device for sensing a hovering action of an object within a certain distance in front of the hover sensing module 170. In certain embodiments, the hover sensing module 170 may be a transparent sensing film attached on the barrier module 150. In certain embodiments, the hover sensing module 170 and the barrier module 150 may be an integrated layer attached on the display module 110. In certain embodiments, the hover sensing module 170 may include multiple film layers, and each film layer of the hover sensing module 170 may be respectively disposed in front of, behind, or in-between the display module 110 and the barrier module 150.

The term "hovering", as used herein, refers to a non-touching triggering action with touch sensing devices, such as touch panels or touch screens. Generally, a touch sensing device provides a touch surface for a user (the viewer) to use a finger or fingers to touch and move around the touch surface to input certain commands, e.g., moving a cursor, clicking a button, or pressing a key shown on the display device. However, some touch sensing devices may detect non-touching actions within a certain range in front of the touch surface, allowing the user to use hand movement or movement of an object (such as using a pen or a pointer object) in front of the touch surface without actually touching the touch surface to trigger the input commands. Such non-touching triggering actions are called hovering. In other words, hovering is essentially a "touchless touching" action because the moving hand or the moving object (e.g., pen) does not directly contact the touch panel.

In certain embodiments, a touch sensing device with hovering sensing functions may be switchable between a touch-only mode and a hovering mode. For example, a capacitance touch sensing device may provide the hovering sensing functions. In the touch-only mode, the touch sensing device is only responsive to touching actions, and does not detect hovering actions. In the hovering mode, the touch sensing device may detect both touching and hovering actions. To implement such a switchable touch sensing device, the touch sensing device may include a touch sensing module for detecting touching actions and a separate hover sensing module for detecting hovering actions. In certain embodiments, a switchable sensing module may be used for detecting both touching and hovering actions. For the three-dimensional display device 100, either the separate hover sensing module or the switchable sensing module may be adopted as the hover sensing module 170.

Figure 5A:
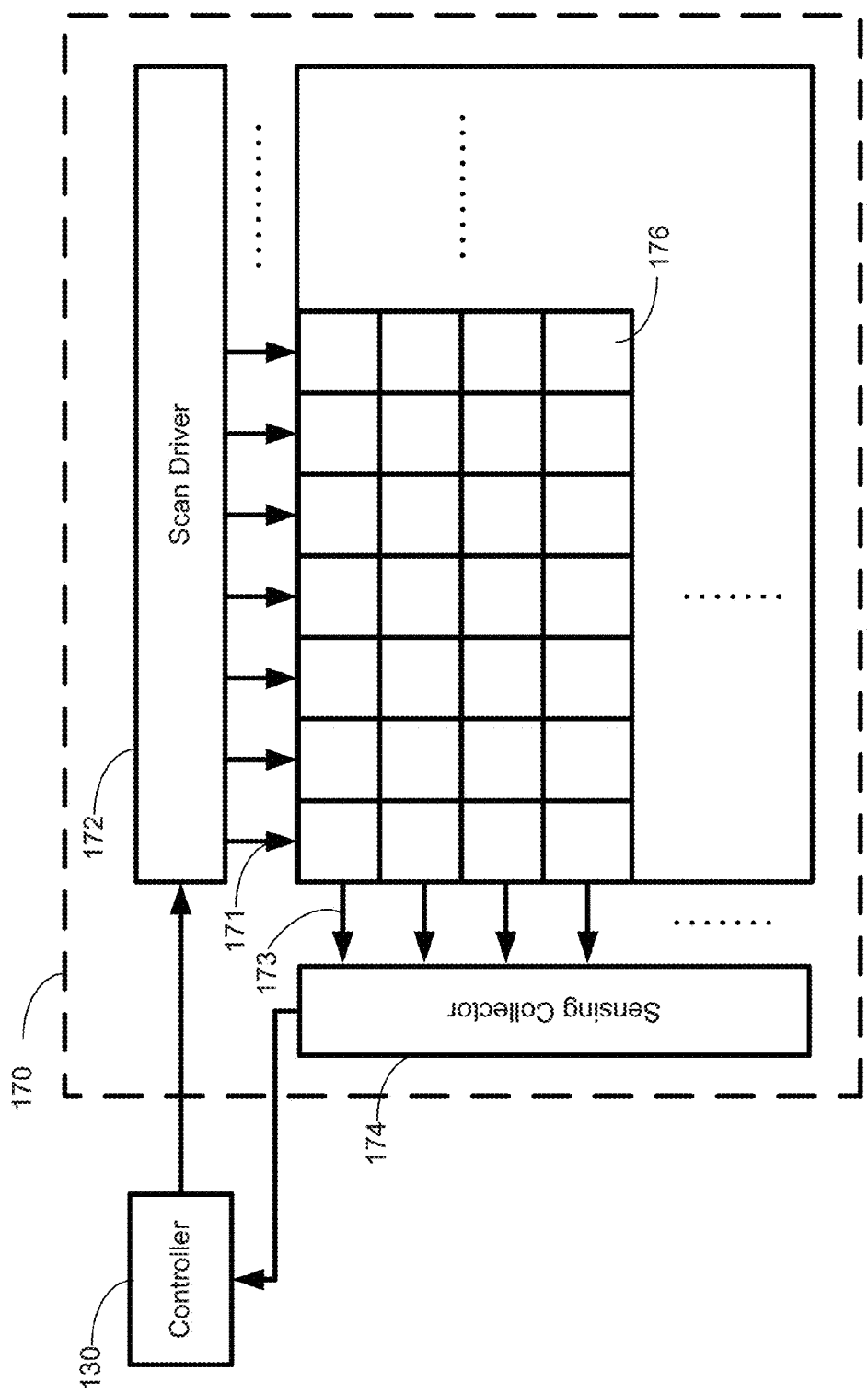
FIG. 5A schematically depicts a hover sensing module according to one embodiment of the present disclosure.

FIG. 5A schematically depicts a hover sensing module according to one embodiment of the present disclosure. As shown in FIG. 5A, the hover sensing module 170 includes a scan driver 172 and a sensing collector 174 respectively connected to the controller 130. The scan driver 172 is configured to receive scan signals from the controller 130. The sensing collector 174 is configured to collect sensing signals corresponding to the objects in front of the hover sensing module 170, and to send the sensing signals to the controller 130 for processing. Further, a plurality of capacitive sensing units 176 is defined on the hover sensing module 170 to form a capacitive matrix. Each capacitive sensing unit 176 has a two-dimensional location (X, Y) on the capacitive matrix. The scan driver 172 is electrically connected to a plurality of scan lines 171 to transmit the scan signals to each of the capacitive sensing units 176 along the column direction of the capacitive matrix, and the sensing collector 174 is electrically connected to a plurality of sensing lines 173 to receive the sensing signals from the capacitive sensing units 176 along the row direction of the capacitive matrix. In other words, each capacitive sensing unit 176 is electrically connected to at least one scan line 171 and at least one sensing line 173. In certain embodiments, the capacitive matrix may be formed by capacitive electrodes or ultrasonic transducers.

Figure 5B:
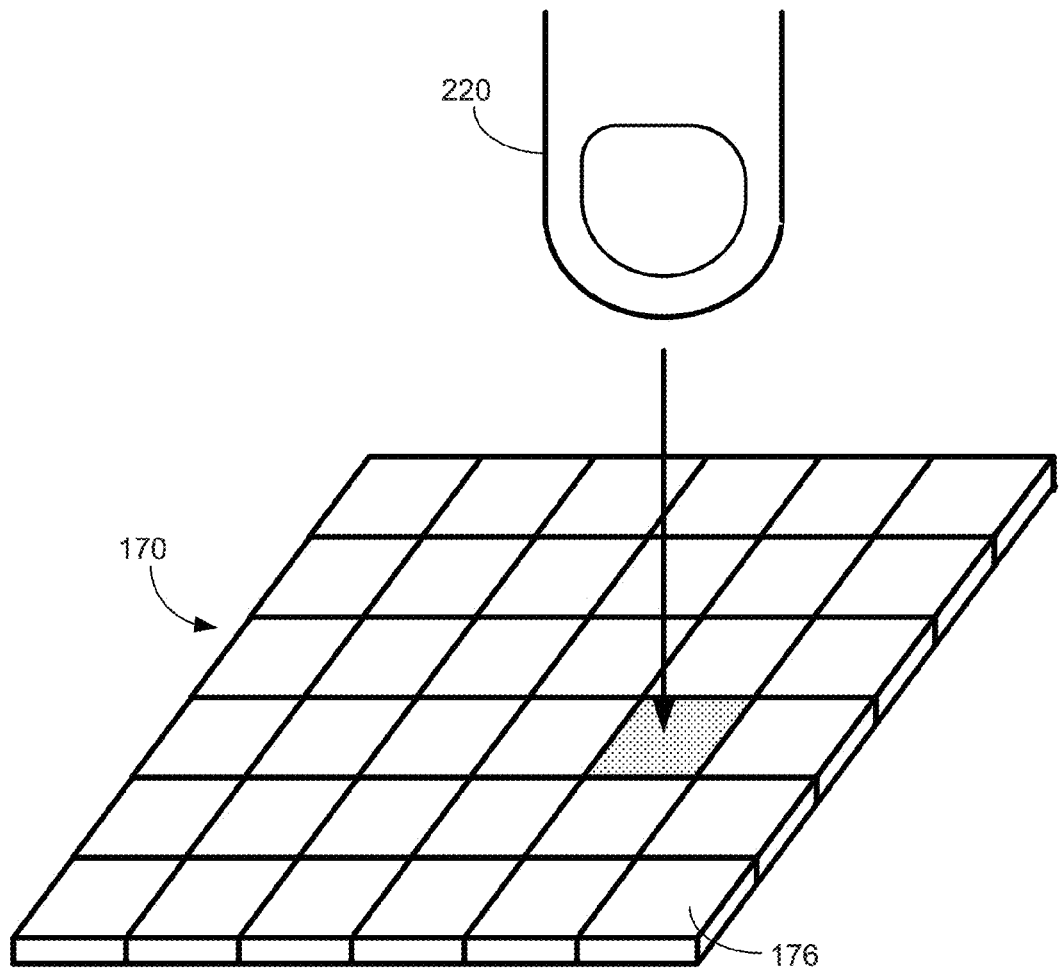
FIG. 5B schematically depicts a capacitive matrix of the hover sensing module according to one embodiment of the present disclosure.

FIG. 5B schematically depicts a capacitive matrix of the hover sensing module according to one embodiment of the present disclosure. As shown in FIG. 5B, the size of each capacitive sensing unit 176 is relatively small such that each key of the three-dimensional virtual keyboard 250 corresponds to multiple capacitive sensing units 176. In certain embodiments, when an object (e.g. the finger 220) approaches the capacitive matrix of the hover sensing module 170, the finger 220 may trigger all nearby capacitive sensing units 176 to generate a sensing signal. However, the capacitive sensing unit 176 along the pointing direction of the finger 220, as shown by the dotted area, may generate the largest sensing signal because of the relatively shortest distance between the capacitive sensing unit 176 and the finger 220. Accordingly, by detecting and comparing all sensing signal generated by the of the capacitive sensing units 176 of the hover sensing module 170, a three-dimensional object coordinate (X, Y, Z) can be determined, where (X, Y) refers to the two-dimensional location of the capacitive sensing unit 176 on the capacitive matrix, and Z refers to the distance between the capacitive sensing unit 176 and the finger 220.

Figure 5C:
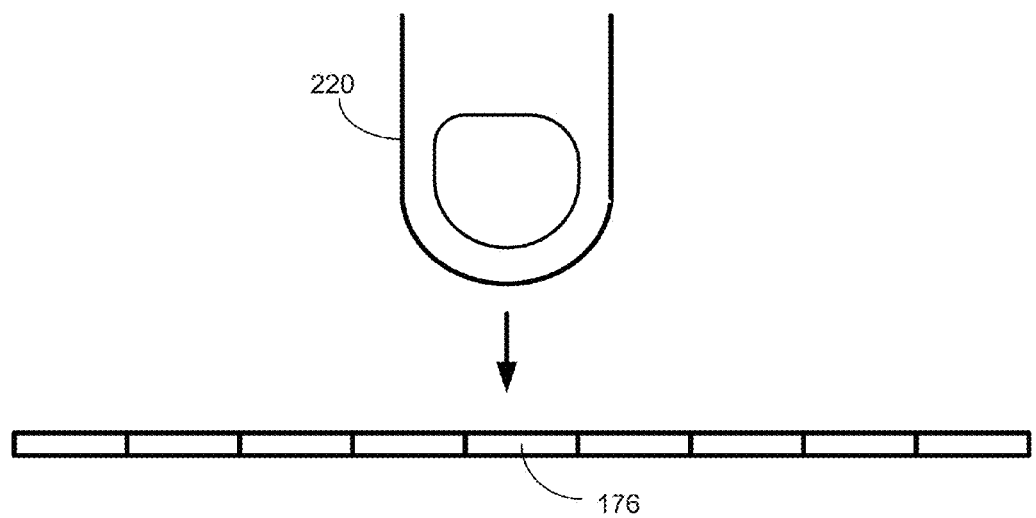
FIG. 5C schematically depicts a finger triggering a hover sensing module formed by capacitive sensor electrodes according to one embodiment of the present disclosure.

In certain embodiments, the capacitive sensing units 176 of the hover sensing module 170 may be capacitive sensor electrodes. FIG. 5C schematically depicts a finger triggering a hover sensing module formed by capacitive sensor electrodes according to one embodiment of the present disclosure. The capacitive sensor electrodes can be made of electrode materials, as long as the material may induce a capacitance change when a finger or an object approaches. Thus, the induced capacitance change may be the sensing signal. In certain embodiments, the capacitive sensor electrodes can be made of transparent electrode materials. In certain embodiments, the capacitive sensor electrodes can be made of conductive metals such as copper or indium tin oxide (ITO).

As shown in FIG. 5C, when an object (e.g. the finger 220) approaches the capacitive matrix of the hover sensing module 170, the finger 220 may trigger all nearby capacitive sensor electrodes 176 such that each capacitive sensor electrode 176 induces a capacitance change due to the existence of the finger 220. The induced capacitance change is determined by the distance Z between the capacitive sensor electrode 176 and the finger 220, where a shorter distance Z induces a larger capacitance change. Thus, the capacitive sensor electrode 176 along the pointing direction of the finger 220 may generate the largest induced capacitance change. Accordingly, by detecting and comparing all capacitance changes of the capacitive sensor electrodes 176 of the hover sensing module 170, and comparing the largest induced capacitance change to a plurality of predetermined standardized capacitance change values, the object coordinate (X, Y, Z) can be determined.

Figure 5D:
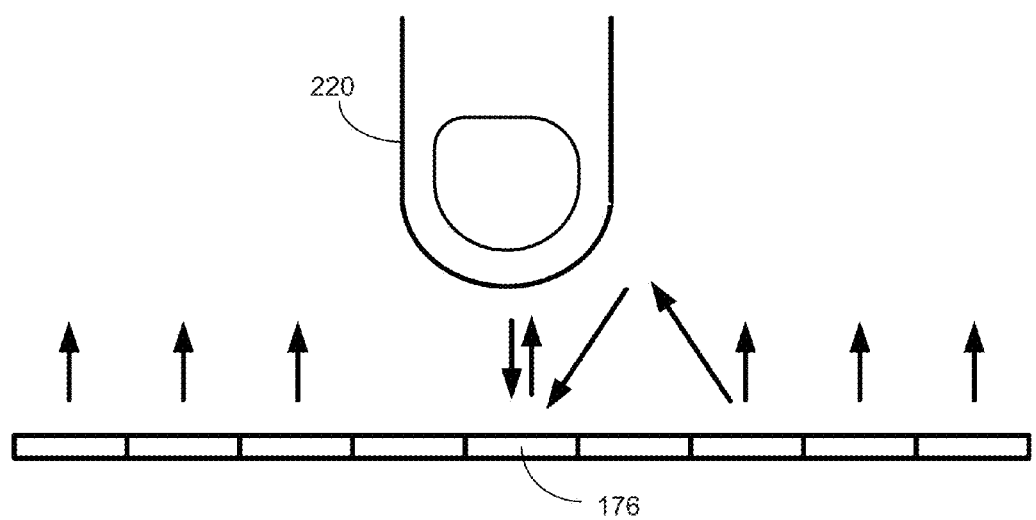
FIG. 5D schematically depicts a finger triggering a hover sensing module formed by capacitive micromachined ultrasonic transducers (CMUTs) according to one embodiment of the present disclosure.

In certain embodiments, the hover sensing module 170 may be a high-intensity focused ultrasound (HIFU) transducer panel formed by CMUTs. FIG. 5D schematically depicts a hover sensing module formed by CMUTs according to one embodiment of the present disclosure. As shown in FIG. 5D, each capacitive sensing unit 176 is a CMUT array, including a plurality of CMUT units. In certain embodiments, a CMUT unit is constructed on silicon using micromachining technique, and the size of the CMUT units can be relatively small such that each key of the three-dimensional virtual keyboard 250 may correspond to one or more CMUT arrays. To form a CMUT unit, a cavity is formed in a silicon substrate. A thin layer is suspended on the top of the cavity to serve as a membrane on which a metallized layer acts a top electrode, together with the silicon substrate which serves as a bottom electrode. The CMUT unit may work as a transmitter/receiver of ultrasonic waves. When an AC signal is applied across the biased electrodes, the CMUT unit generates ultrasonic waves in the medium of interest. In this case, the CMUT unit works as a transmitter. On the other hand, when ultrasonic waves are applied on the membrane of the biased CMUT unit, the capacitance of the CMUT unit is changed to generate an alternating signal. In this case, the CMUT unit works as a receiver of ultrasonic waves.

When the HIFU transducer panel is used as the hover sensing module 170, the controller 130 periodically sends AC pulse signals to the CMUT units for generating and transmitting ultrasonic waves. As long as the CMUT units receive the AC pulse signals, the CMUT units transmit ultrasonic waves. As shown in FIG. 5D, when an object (e.g. the finger 220) approaches the capacitive matrix of the hover sensing module 170, the finger 220 may reflect the ultrasonic waves transmitted by all nearby CMUT arrays 176 such that each CMUT array 176 may receive the reflected ultrasonic waves to generate alternating signals. Since the ultrasonic waves has a predetermined transmission speed, the distance Z between the CMUT array 176 and the finger 220 is one half of the transmission distance of the ultrasonic waves, which may be calculated by multiplying the transmission time of the ultrasonic waves to the speed. Accordingly, by calculating and average all transmission distance of the ultrasonic waves of the CMUT units in each CMUT array, the object coordinate (X, Y, Z) can be determined.

It should be appreciated that the CMUT units may transmit the ultrasonic waves to any direction, and may receive reflected ultrasonic waves transmitted by other CMUT units. However, as shown in FIG. 4D, the transmission distance of the ultrasonic wave in a perpendicular direction to the hover sensing module 170 may be the shortest transmission distance. Thus, the first reflected ultrasonic wave receive by a CMUT unit is always the ultrasonic wave transmitted by the CMUT unit. In other words, for a CMUT unit, the transmission time of the ultrasonic waves is the time period from the transmission of the ultrasonic waves to the time when the CMUT unit firstly receives a reflected ultrasonic wave.

It should be appreciated that different types of capacitive sensing units 176 may have different advantages in sensitivity and sensible ranges. For example, the CMUT arrays may detect objects from a longer distance than the capacitive sensor electrodes. On the other hand, the capacitive sensor electrodes may be more power efficient.

Figure 5E:
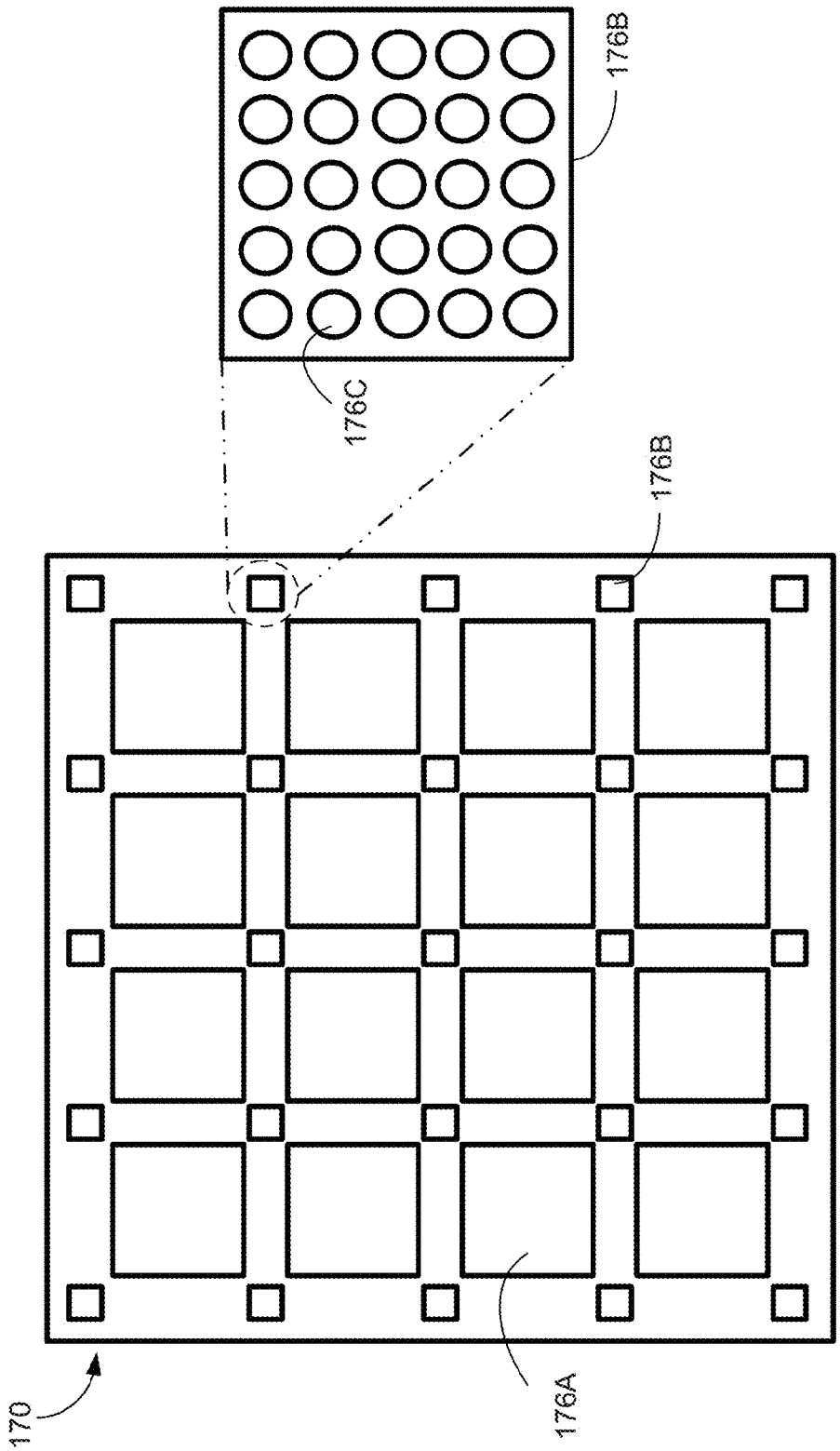
FIG. 5E schematically depicts a hover sensing module formed by both capacitive sensor electrodes and CMUTs according to one embodiment of the present disclosure.
Figure 5F:
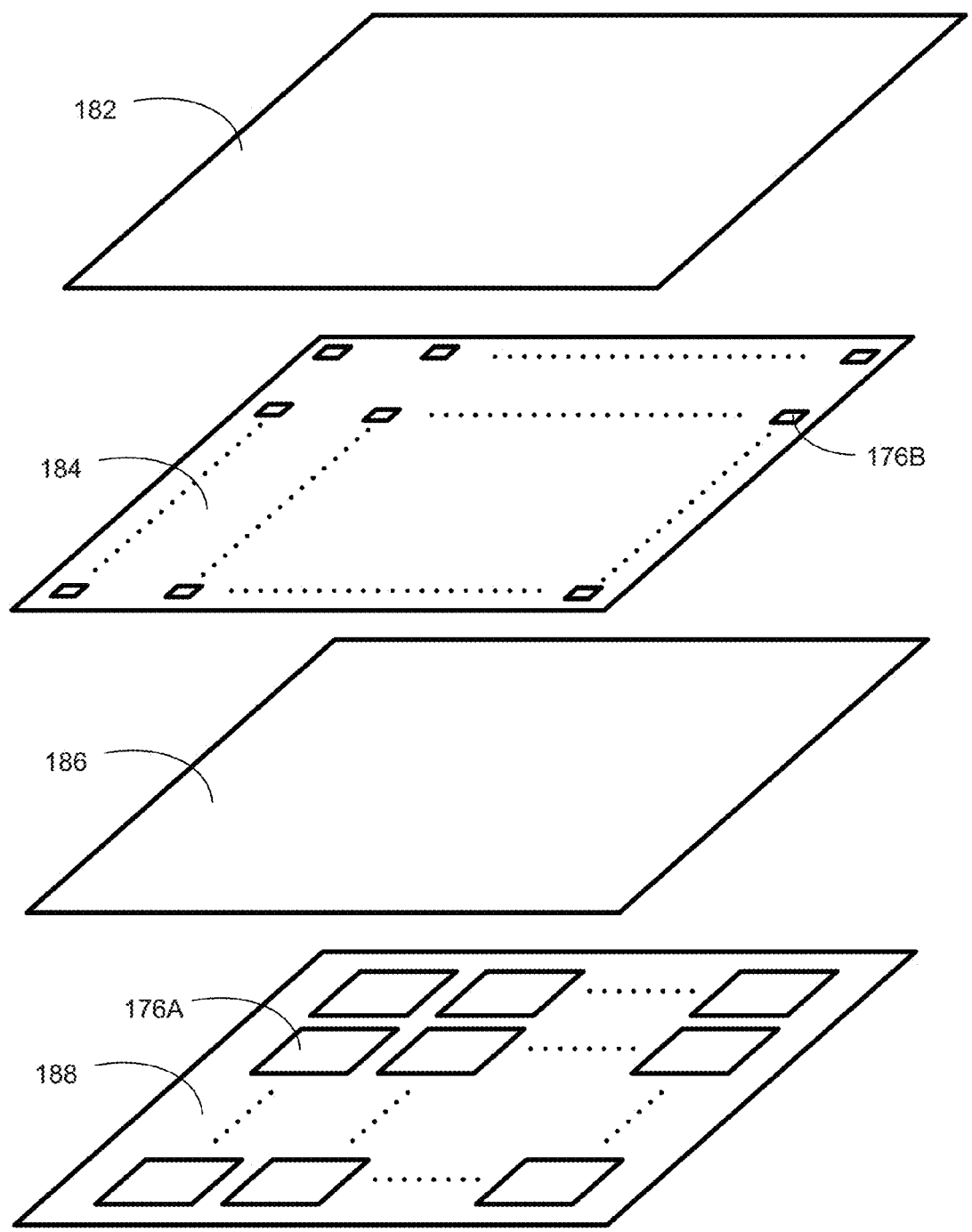
FIG. 5F schematically depicts the dissembled layer view of the hover sensing module as shown in FIG. 5E according to one embodiment of the present disclosure.

In certain embodiments, the hover sensing module 170 may use two or more types of capacitive sensing units 176 to form a multi-hover sensing device. FIGS. 5E and 5F schematically depict a hover sensing module formed by both capacitive sensor electrodes and CMUTs according to one embodiment of the present disclosure, where FIG. 5E shows a top view, and FIG. 5F shows a dissembled perspective view.

As shown in FIG. 5E, the hover sensing module 170 includes both capacitive sensor electrodes 176A and CMUT arrays 176B as the capacitive sensing units. In certain embodiments, each capacitive sensor electrode 176A is a 3*3 $mm^2$ square, and each two adjacent capacitive sensor electrodes 176A has a 1 mm gap therebetween. In certain embodiments, each CMUT array 176B is located at the corner of the capacitive sensor electrodes 176A. Each CMUT array 176B is a 750*750 $um^2$ square, and is formed with 5*5 CMUT units 176C. Each CMUT unit 176C has a circular shape with a diameter of 100 um, and the distance between two adjacent CMUT units 176C is 150 um.

As shown in FIG. 5F, the hover sensing module 170 has four layers, including a cover layer 182, a HIFU layer 184, an isolation layer 186 and an electrode layer 188. The cover layer 182 is a protective layer, covering other layers of the hover sensing module 170. The HIFU layer 184 is the layer where the CMUT arrays 176B are formed. The isolation layer 186 is a layer isolating the HIFU layer 184 and the electrode layer 188 to prevent from short-circuiting. The electrode layer 188 is a printed circuit board (PCB) layer where the capacitive sensor electrodes 176A are formed. In certain embodiments, the thickness of the cover layer 182 is 150 um, the thickness of the HIFU layer 184 is 8 um, the thickness of the isolation layer 186 is 1 mm, and the thickness of the electrode layer 188 is 1.6 mm.

It should be appreciated that the exemplary embodiments of the hover sensing module 170 are presented only for the purposes of illustration and description, and are not intended to limit the structure of the hover sensing module 170.

The controller 130 controls operations of the display module 110, the barrier module 150, and the hover sensing module 170. Specifically, the controller 130 is configured to generate display signals for controlling the pixels 116 of the display panels 110 to display the images, and to control the hover sensing module 170 to measure sensing signals of the object. In certain embodiments, when the barrier module 150 is switchable between the two-dimensional and three-dimensional display modes, the controller 130 is configured to generate control signals for switching the barrier module 150 between the two modes.

Figure 6A:
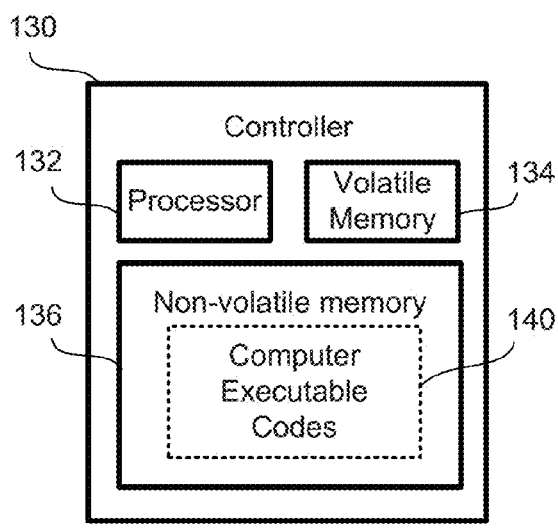
FIG. 6A schematically depicts a controller of the display device according to one embodiment of the present disclosure.

FIG. 6A schematically depicts a controller of the display device according to one embodiment of the present disclosure. As shown in FIG. 6A, the controller 130 includes one or more processors 132 for executing instructions, one or more volatile memory 134, and one or more non-volatile memory 136. In certain embodiments, the controller 130 may be one or more specialized microcontroller capable of being installed in a computer, such as a microcontroller unit (MCU), a service processor (SP) or a baseboard management controller (BMC). Each specialized microcontroller may include one or more chipsets, and may include a processor 132, a volatile memory 134, and a non-volatile memory 136. In certain embodiments, the controller 130 may include other storage devices in addition to the volatile memory 134 and the non-volatile memory 136. For example, the storage devices may include a static random-access memory (RAM), a flash memory, or any types of storage unit as long as it may store data.

The processor 132 is a host processor of the controller 130, controlling operation and executing instructions of the controller 130. The volatile memory 134 is a temporary memory storing information in operation, such as the instructions executed by the processor 132. For example, the volatile memory 134 may store the threshold matrix and the measurement matrix generated by the image processing module 144. In certain embodiments, the volatile memory 134 may be a random-access memory (RAM). In certain embodiments, the volatile memory 134 is in communication to the processor 132 through appropriate buses or interfaces. In certain embodiments, the controller 130 may include more than one processor 132 or more than one volatile memory 134.

The non-volatile memory 136 is a persistent memory for storing data and instructions even when not powered. For example, the non-volatile memory 136 can be a flash memory. In certain embodiments, the non-volatile memory 136 is in communication to the processor 132 through appropriate buses or interfaces. In certain embodiments, the controller 130 may include more than one non-volatile memory 136.

As shown in FIG. 6A, the non-volatile memory 136 stores computer executable codes 140. The codes 140 are configured, when executed at the processor 132, to control the pixels 116 of the display module 110, to control the sensing of the hover sensing module 170, and to control the barrier module 150.

Figure 6B:
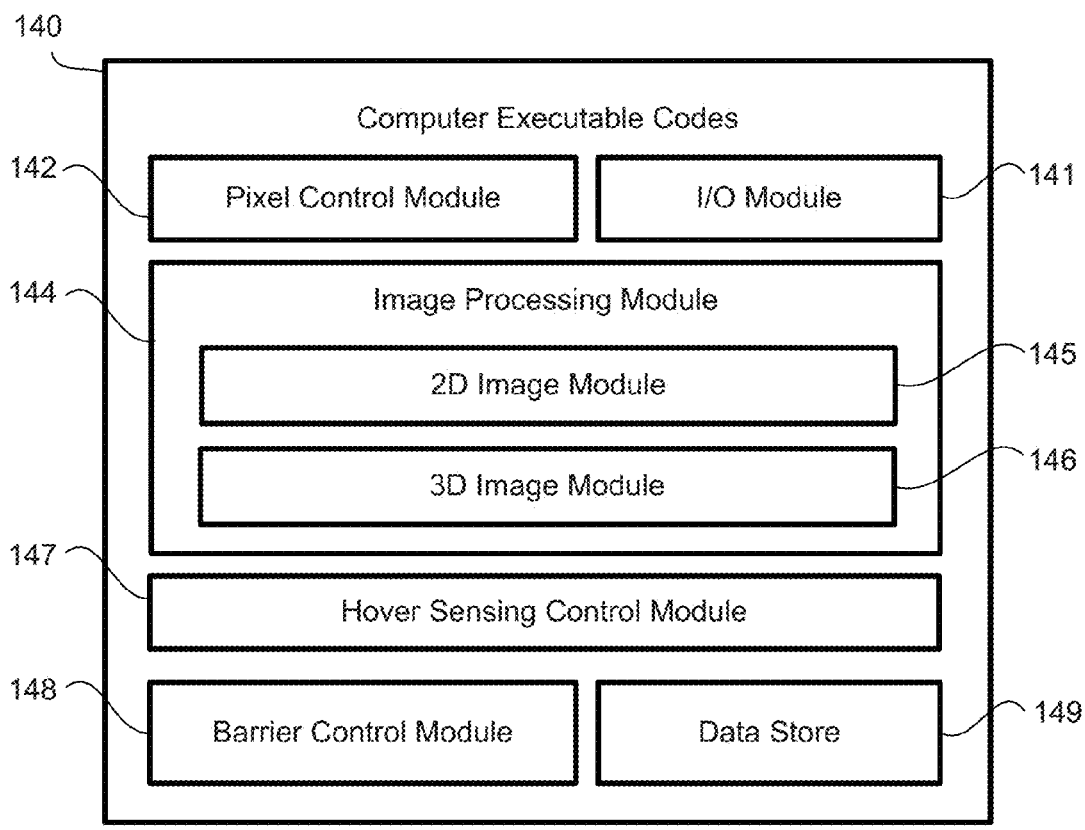
FIG. 6B schematically depicts computer executable codes of the controller according to one embodiment of the present disclosure.

FIG. 6B schematically depicts computer executable codes of the controller according to one embodiment of the present disclosure. As shown in FIG. 6B, the codes 140 include an input/output module 141, a pixel control module 142, an image processing module 144, a hover sensing control module 147, a barrier control module 148, and one or more data stores for storing parameters and operational data for the modules. In certain embodiments, the image processing module 144 includes a 2D image module 145 for processing two-dimensional images, and a 3D image module 146 for processing three-dimensional images.

The I/O module 141 controls the correspondence of the input signals and the output signals. For example, when the viewer inputs commands via an input device connected to the controller 130, such as a keyboard, a mouse, a touch panel or other input devices, the I/O module 141 receives the input signals corresponding to the commands, and processes with the commands. When the controller 130 generates output signals for a corresponding output device, such as the display signals (the scan signals and the data signals) for the pixels 116 of the display module 110, the I/O module 141 sends the output signals to the corresponding output device.

The pixel control module 142 generates the display signals (the scan signals and data signals) for controlling the pixels 116 of the display module 110. When the pixel control module 142 receives a display instruction from the image processing module 144 to display certain image signals on the display module 110, the pixel control module 142 generates the corresponding scan signals and data signals according to the image signals, and sends the scan signals and data signals to the scan driver 114 and data driver 112 of the display module 110 via the I/O module 141. The image signals can include two-dimensional or three-dimensional images, or a combination of both two-dimensional and three-dimensional images.

The image processing module 144 is configured to process the two-dimensional and three-dimensional images to generate corresponding image signals for the pixel control module 142. In certain embodiments, the image processing module 144 includes a 2D image module 145 for processing two-dimensional images, and a 3D image module 146 for processing three-dimensional images.

The 2D image module 145 processes images in the two-dimensional display mode and generates corresponding image signals for the two-dimensional images. Generally, to display an image in its original size in the two-dimensional display mode, the image is processed in a pixel-to-pixel method. In other words, only one pixel 116 of the display module 110 is used for displaying the image data corresponding to the one pixel 116. Thus, for each pixel of the image, the 2D image module 145 processes data to generate an image signal corresponding to the pixel, and send the image signal to the pixel control module 142.

The 3D image module 146 processes images in the three-dimensional display mode and generates corresponding image signals for the three-dimensional images. As described above, in the three-dimensional display mode, all pixels 116 in the pixel matrix are divided into two sets. For example, the pixels 116 corresponding to the left-eye view are the pixels 116 with odd numbers in the region 116L, and the pixels 116 corresponding to the right-eye view are the pixels 116 with even numbers in the region 116R. In other words, two pixels 116 (one odd-number pixel and one even-number pixel) are used for displaying the image data corresponding to the one pixel 116, regardless of the image being two-dimensional or three-dimensional.

To display a three-dimensional image in the three-dimensional display mode, the virtual position of the three-dimensional image must be determined. Using the virtual keyboard 250 as shown in FIG. 4C as an example, when the position of the three-dimensional virtual image (i.e. the virtual keyboard 250) is determined, the two regions 116L and 116R and the pixel offset PO may be calculated by the projections of the three-dimensional virtual image to the display module. Each odd-number pixel 116 in the region 116L is assigned a pixel value for the left-eye view of the three-dimensional image, and each even-number pixel 116 in the region 116R is assigned a pixel value for the right-eye view of the three-dimensional image. Thus, for each pixel in the regions 116L and 116R, the 3D image module 146 processes data of the pixel value to generate an image signal corresponding to the pixel, and send the image signal to the pixel control module 142.

On the other hand, the three-dimensional display mode may be utilized to display a two-dimensional image. Since the two-dimensional image does not involve the sense of depth, the position of the two-dimensional image may be predetermined to be at the barrier module 150. In this case, the two adjacent even-number pixel and odd-number pixel are both assign the same pixel value to provide the same pixel value for the two eyes of the viewer. For example, as shown in FIG. 4A, the virtual object 400 is positioned right on the barrier module 150, and the pixel offset is the minimum one-pixel offset. For the viewer in the optimum viewable zone 200, the pixels 116 labeled (L1, L2, L3) provide the left-eye view, and the pixels labeled (R1, R2, R3) provide the right-eye view, forming the virtual object 400. Thus, the pixel L1 and the pixel R1 form a pixel pair L1-R1, the pixel L2 and the pixel R2 form a pixel pair L2-R2, and the pixel L3 and the pixel R3 form a pixel pair L3-R3. When the corresponding pixel pairs L1-R1, L2-R2 and L3-R3 are respectively assigned the same pixel value, the viewer may receive the same image signals of the three pixels with both eyes to perceive a two-dimensional image.

As described above, the three-dimensional display mode is capable of displaying both two-dimensional and three-dimensional images.

Figure 6C:
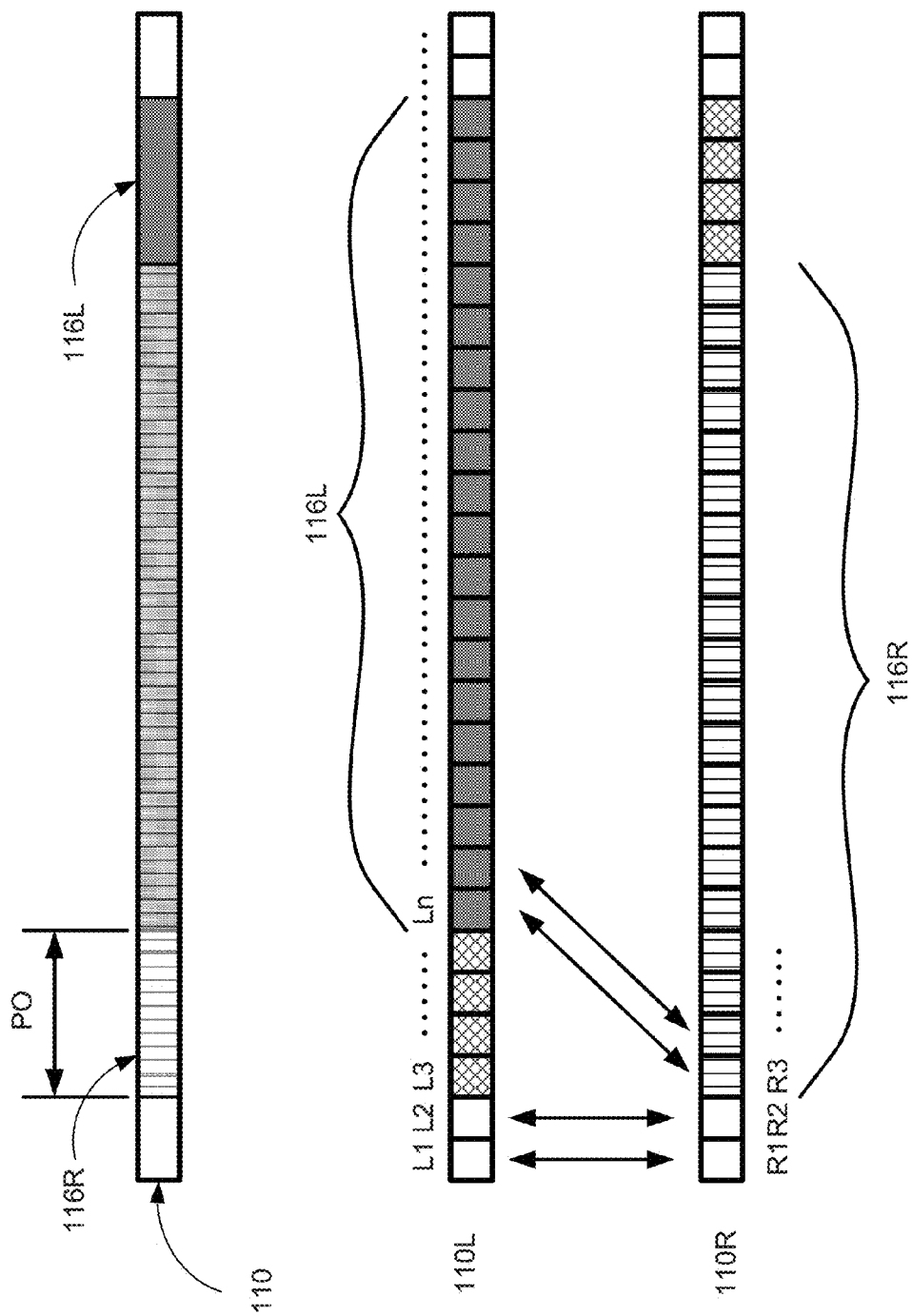
FIG. 6C schematically depicts image processing for displaying a two-dimensional image and a three-dimensional image according to one embodiment of the present disclosure.

FIG. 6C schematically depicts image processing for displaying a two-dimensional image and a three-dimensional image according to one embodiment of the present disclosure. An example of the two-dimensional image and the three-dimensional image is shown in FIG. 1D, where the two-dimensional image 190 serves as a background image, and the three-dimensional image may be the three-dimensional virtual keyboard 250. In this embodiment, the three-dimensional virtual keyboard 250 is non-transparent.

As shown in FIG. 6C, the pixel matrix of the display module 110 may be divided into two sets of pixels 116L and 116R. The pixel set 116L includes all odd-number pixels (labeling L1, L2, L3, etc.) that are viewable by the left eye, and the pixel set 116R includes all even-number pixels (labeling R1, R2, R3, etc.) that are viewable by the right eye. The two regions 116L and 116R are used for displaying the three-dimensional image. Other pixels not used for displaying the three-dimensional image are used for displaying the two-dimensional image.

For each of the corresponding pixel pairs L1-R1 and L2-R2, the pixels are respectively assigned the same pixel value because the pixel pairs are used for displaying the two-dimensional image (i.e. the background image). However, there is no pixel for the pixel L3 to pair with because the pixel R3 is in the region 116R for displaying the three-dimensional image (i.e. the three-dimensional virtual keyboard 250). In other words, the pixel R3, as the first pixel in the region 116R, is paired with the pixel Ln, which is the first pixel in the region 116L. Similarly, the pixels L4, L5, . . . , Ln−1 do not have any pixels to pair with. These pixels are assigned the pixel value of the two-dimensional image (i.e. the background image).

When the viewer see the image displayed on the display device 100, the viewer receives, with both eyes, from each the pixel pairs L1-R1 and L2-R2 the same image signals to perceive the two-dimensional image (i.e. the background image). For the pixels L3 to Ln−1, the viewer only receives the image signal with the left eye, and may perceive the pixels as a part of the two-dimensional image (i.e. the background image). For the pixels in the regions 116L and 116R, the viewer receives the different left-eye and right-eye views respectively with the two eyes, and perceives the image as the three-dimensional image (i.e. the three-dimensional virtual keyboard 250). For the pixels next to the regions 116L and 116R, the viewer receives the image signals from these pixels and perceives the pixels as a part of the two-dimensional image (i.e. the background image). Thus, the viewer may perceive the whole image displayed by the display device 100 as shown in FIG. 1D, with the three-dimensional virtual keyboard 250 floating out-of-screen in the air, and the two-dimensional background image shown on the viewable region 190 of the display device 100.

Figure 6D:
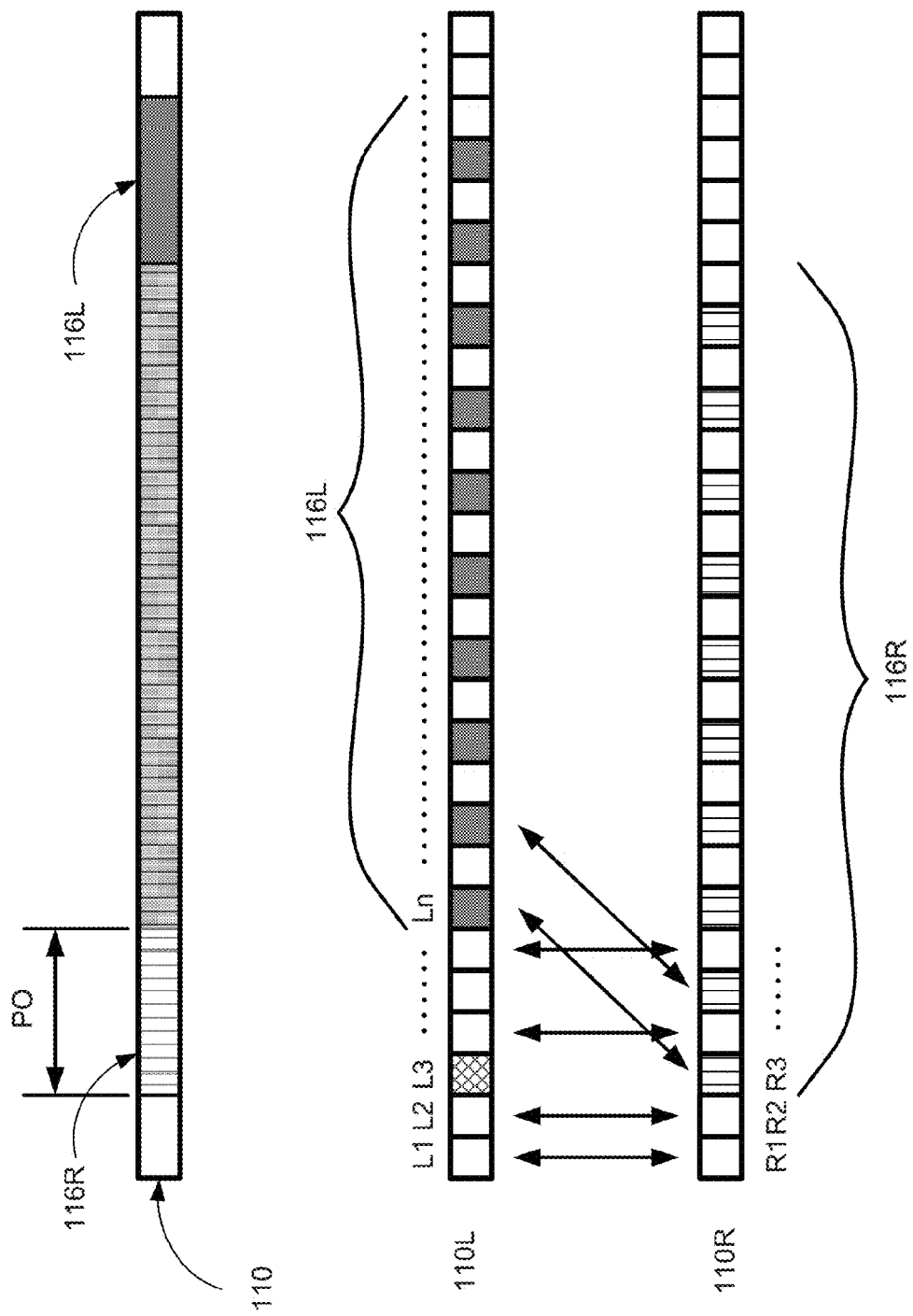
FIG. 6D schematically depicts image processing for displaying a two-dimensional image and a semi-transparent three-dimensional image according to one embodiment of the present disclosure.

It should be appreciated that the transparency of the three-dimensional virtual keyboard 250 may be adjusted. For example, FIG. 6D schematically depicts image processing for displaying a two-dimensional image and a semi-transparent three-dimensional image according to one embodiment of the present disclosure, where the three-dimensional virtual keyboard 250 is 50% transparent. In other words, only 50% of the pixels in the regions 116L and 116R are used to display the three-dimensional image (the three-dimensional virtual keyboard 250), and the other 50% of the pixels in the regions 116L and 116R are used to display the two-dimensional image (i.e. the background image).

The hover sensing control module 147 controls the operation of the hover sensing module 170. When the hover sensing control module 147 receives a hover sensing instruction to start detecting hovering actions, the hover sensing control module 147 generates the corresponding scan signals, and sends the scan signals to the scan driver 172 of the hover sensing module 170. When the hover sensing control module 147 receives the sensing signals from the hover sensing module 170, the hover sensing control module 147 processes the sensing signals to determine the object coordinate (X, Y, Z). In certain embodiments, the hover sensing control module 147 may retrieve sensing parameters for the virtual keyboard 250 from the data store 149.

The barrier control module 148 controls the operation of the barrier module 150. In certain embodiments, when the barrier module 150 is a parallax barrier module 150 switchable between two-dimensional and three-dimensional modes, the barrier control module 148 may control the opaque units 154 to be switchable between the transparent state and the opaque state. When the barrier control module 148 receives a display instruction to switch to the two-dimensional mode, the barrier control module 148 controls the opaque units 154 to become transparent. When the barrier control module 148 receives a display instruction to switch to the three-dimensional mode, the barrier control module 148 controls the opaque units 154 to become opaque.

The data store 149 is configured to store parameters of the display device 100, including, among other things the resolution of the display module 110, the display parameters for displaying in the two-dimensional and three-dimensional modes, and the sensing parameters for the hover sensing module 170. In certain embodiments, the data store 149 stores a plurality of parameters for a plurality of virtual keyboards 250, with each virtual keyboard 250 having different keyboard layouts and predetermined virtual positions. For example, for a certain type of virtual keyboard 250 to be displayed at a predetermined position, the display parameters for the virtual keyboard 250 may include the pixel offset PS between the left-eye and right eye views, the pixel values for each pixel in the regions 116L and 116R, and predetermined transparency of the virtual keyboard 250. The sensing parameters for the virtual keyboard 250 may include the type of capacitive sensing units 176 of the hover sensing module 170, standardized capacitance change values for determining the distance Z from the capacitive sensing unit 176 to the finger 220, and a coordinate list for each key defining the ranges of the coordinate (X, Y, Z) corresponding to the key.

Figure 7:
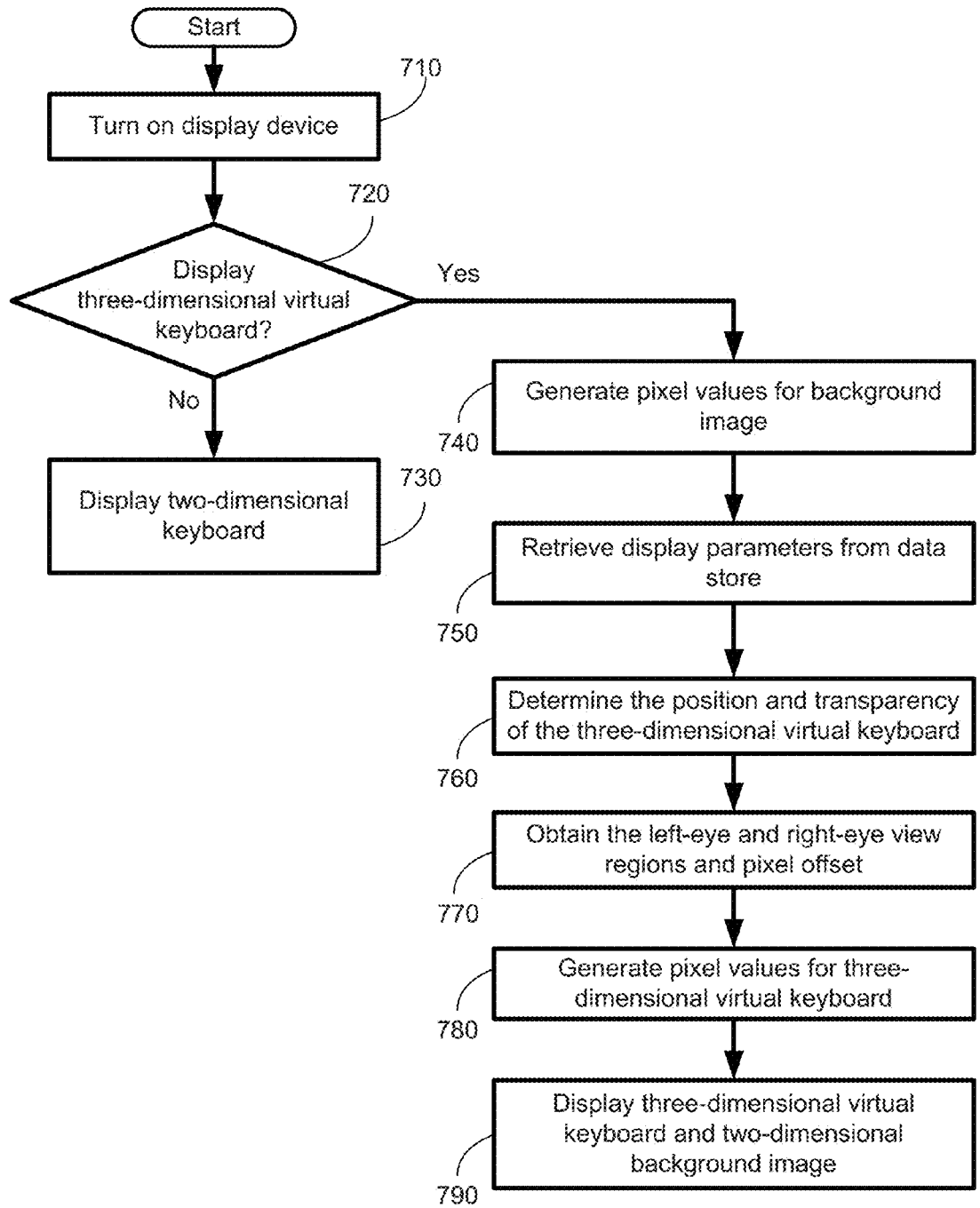
FIG. 7 shows an exemplary flow chart of displaying the three-dimensional virtual keyboard according to one embodiment of the present disclosure.

FIG. 7 shows an exemplary flow chart of displaying the three-dimensional virtual keyboard according to one embodiment of the present disclosure.

At operation 710, the three-dimensional display device 100 is turned on, and the controller 130 launches the codes 140. In certain embodiments, when the three-dimensional display device 100 is turned on, the predetermined display mode is the two-dimensional display mode, and a viewer may input commands to switch the display mode to the three-dimensional display mode.

At operation 720, in the three-dimensional display mode, the viewer may determine if there is a need for displaying the three-dimensional virtual keyboard 250. For example, when the viewer needs to use the keyboard to input texts, the viewer may trigger a keyboard display instruction to display the keyboard, and may choose from one of the out-of-screen three-dimensional virtual keyboard 250 or the on-screen two-dimensional keyboard 198. When the viewer confirms displaying of the three-dimensional virtual keyboard 250, the controller 130 switches the display mode to the three-dimensional display mode, and enters operation 740. When the viewer does not intend to use the three-dimensional virtual keyboard 250, the controller 130 enters operation 730 to display the two-dimensional keyboard 198 on the screen.

When the viewer confirms displaying of the three-dimensional virtual keyboard 250, the current two-dimensional image displayed on the display module 110 becomes the background image. At operation 740, the 3D image module 146 of the image processing module 144 processes with the background image, and generates the pixel values for all pixels 116 in the two pixel sets. For some of the pixels 116, the pixel values may be updated to display the three-dimensional virtual keyboards 250.

At operation 750, the 3D image module 146 retrieves display parameters of the three-dimensional virtual keyboard 250 from the data store 149. As described above, the data store 149 may store display parameters for different types of virtual keyboards 250 at different positions. For each virtual keyboard 250, the display parameters may include the pixel offset PS between the left-eye and right eye views, the pixel values for each pixel in the regions 116L and 116R, and predetermined transparency of the virtual keyboard 250. In certain embodiments, the controller may display a list of information of the virtual keyboards 250 on the display module for the viewer to choose from.

At operation 760, the 3D image module 146 determines the position and transparency of the three-dimensional virtual keyboard 250. Specifically, the 3D image module 146 receives a command from the viewer to select one of the virtual keyboards 250 with the predetermined position and transparency of the virtual keyboard 250. At operation 770, the 3D image module 146 obtains the left-eye and right-eye view regions and pixel offset corresponding to the virtual keyboard 250 at the position. At operation 780, the 3D image module 146 generates the pixel values for the three-dimensional virtual keyboard 250, which is shown by the pixels 116 in the two regions 116L and 116R. For these pixels 116, the generated pixel values for the three-dimensional virtual keyboard 250 replaces the earlier generated pixel values of the two-dimensional background image at operation 740.

At operation 790, the controller 130 displays the three-dimensional virtual keyboard 250 and the two-dimensional background image on the display module 110. Specifically, the 3D image module 146 sends the pixel values for all pixels as image signals to the pixel control module 142. The pixel control module 142 generates the display signals (the scan signals and the data signals) according to the image signals, and sends the display signals to the display module 110 via the I/O module 141. Upon receiving the display signals, the display module 110 displays the images. When the viewer sees the image displayed by the display module 110, the viewer perceives the out-of-screen three-dimensional virtual keyboard 250 floating in the air at the predetermined position, and the two-dimensional background image behind the virtual keyboard 250.

Figure 8:
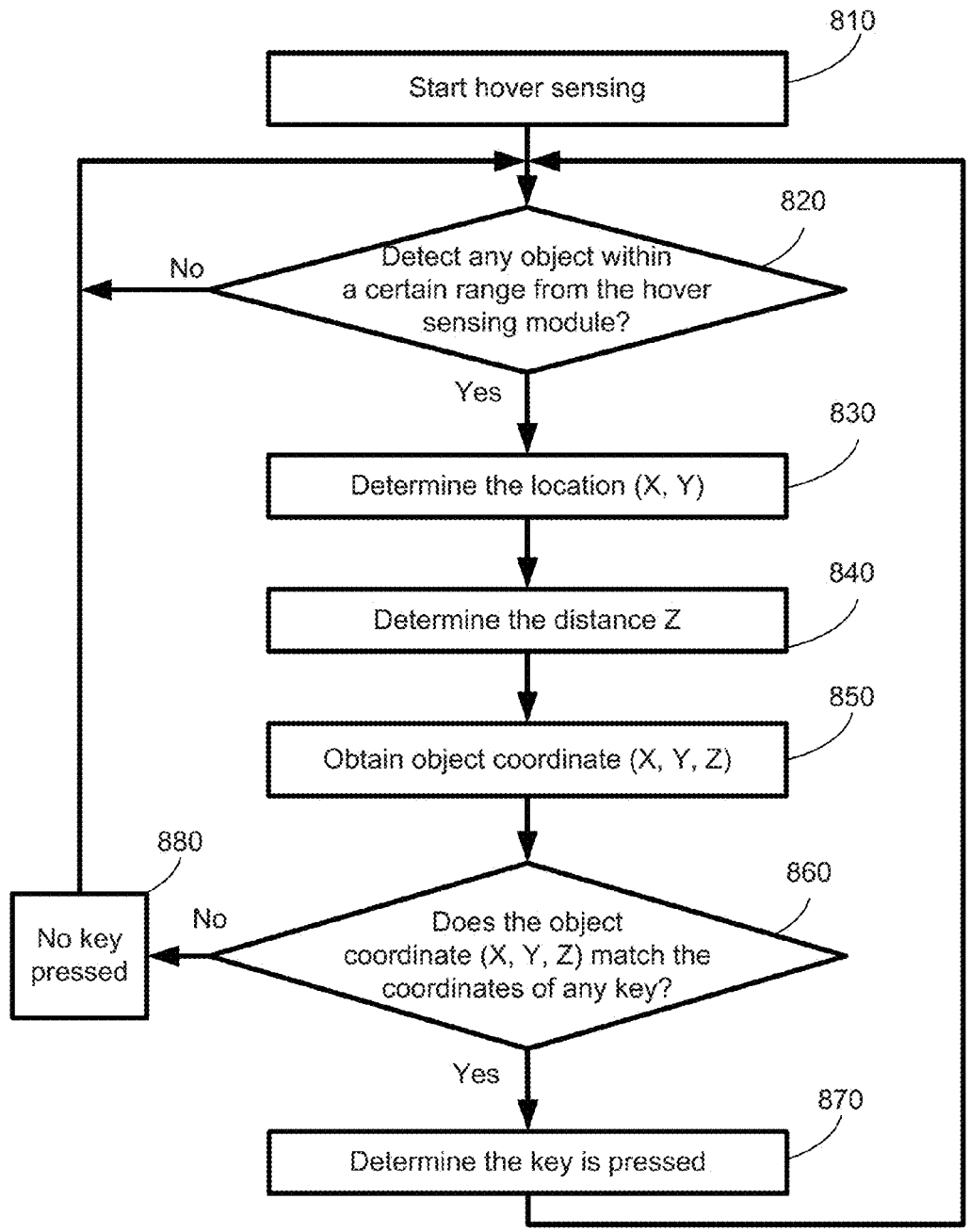
FIG. 8 shows an exemplary flow chart of detecting hovering action for the three-dimensional virtual keyboard according to one embodiment of the present disclosure.

FIG. 8 shows an exemplary flow chart of detecting hovering action for the three-dimensional virtual keyboard according to one embodiment of the present disclosure.

At operation 810, once the three-dimensional virtual keyboard 250 is displayed, the hover sensing control module 147 controls the hover sensing module 170 to start hover sensing. Specifically, the hover sensing control module 147 generates the scan signals, sends the scan signals to the scan driver 172 of the hover sensing module 170, and receives the sensing signals from the hover sensing module 170.

At operation 820, the hover sensing control module 147 determines whether any object exists within a certain range from the hover sensing module 170. In certain embodiments, the hover sensing control module 147 compares the sensing signals to one or more standardized sensing signals. For example, when the hover sensing module 170 is formed by the capacitive sensor electrodes, the hover sensing control module 147 compares the capacitance change of each capacitive sensor electrode with predetermined standardized capacitance change values. If any value of the capacitance change is larger than or equal to the predetermined standardized capacitance change values, the hover sensing control module 147 determines that an object exists within a certain range from the hover sensing module 170, and enters operation 830. If all values are smaller than the predetermined standardized capacitance change values, the hover sensing control module 147 determines that no object exists within the certain range, and returns to 820 for the next detecting cycle.

At operation 830, the hover sensing control module 147 determines the location (X, Y) of the object. As described above, the capacitive sensing unit 176 along the pointing direction of the object (e.g. the finger 220) may generate the largest sensing signal because of the relatively shortest distance between the capacitive sensing unit 176 and the finger 220. Thus, the hover sensing control module 147 compares all sensing signals, and determines the location coordinate (X, Y) of the capacitive sensing unit 176 having the largest sensing signal to be the location of the object.

At operation 840, the hover sensing control module 147 determines the distance Z of the object. For different capacitive sensing units 176, the distance Z may be obtained in a different way. For example, for CMUT arrays, the distance Z is one half of the transmission distance of the ultrasonic waves, which may be calculated by multiplying the transmission time of the ultrasonic waves to the speed. For capacitive sensor electrodes, the distance Z may be determined by comparing the largest induced capacitance change to a plurality of predetermined standardized capacitance change values.

Once the location (X, Y) and the distance Z of the object are obtained, at operation 850, the hover sensing control module 147 obtains the object coordinate (X, Y, Z).

At operation 860, the hover sensing control module 147 compares the object coordinate (X, Y, Z) to the coordinates of all keys of the virtual keyboard 250 to determine whether the object coordinate (X, Y, Z) matches any key. As described above, the size of each capacitive sensing unit 176 is relatively small such that each key of the three-dimensional virtual keyboard 250 corresponds to multiple capacitive sensing units 176. In certain embodiments, each key may have a coordinate list stored in the data store 149 to define the ranges of the coordinate (X, Y, Z) corresponding to the key. The hover sensing control module 147 may retrieve the coordinate list for each key and compare the compares the object coordinate (X, Y, Z) to the coordinate list. When there is no match for the object coordinate (X, Y, Z), the hover sensing control module 148 determines that no key is pressed, and returns to operation 820 for the next detecting cycle. When the object coordinate (X, Y, Z) matches the coordinates of a certain key, the hover sensing control module 147 enters operation 870 to determine the key is pressed. In certain embodiments, the hover sensing control module 147 sends a key pressing command to the I/O module 141, and then returns to operation 820 for the next detecting cycle.

The foregoing description of the example of the digital media management software has been presented only for the purposes of illustration and description and is not intended to be exhaustive or to limit the disclosure to the precise forms disclosed. Many modifications and variations are possible in light of the above teaching.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A three-dimensional display device, comprising:
a display module defining a plurality of pixels in a pixel matrix, wherein the pixels comprise a first set of pixels and a second set of pixels;
a barrier module disposed at a viewer side of the display module, wherein for a viewer at the viewer side, the barrier module is configured to allow light emitted from the first set of pixels to be viewable only by a left eye of the viewer, and allow light emitted from the second set of pixels to be viewable only by a right eye of the viewer, such that the viewer perceives the light emitted from the first set of pixels as a left-eye view and the light emitted from the second set of pixels as a right-eye view, and perceives the left-eye view and the right view to form a three-dimensional virtual image between the viewer and the display module;
a sensing module configured to receive a plurality of first scan signals, to detect an object at the viewer side of the three-dimensional display device in response to receiving the first scan signals, and to generate sensing signals in response to detecting the object; and
a controller electrically connected to the display module and the sensing module, the controller comprising a processor and a non-volatile memory storing computer executable codes, wherein the codes, when executed at the processor, are configured to
generate display signals, and send the display signals to the display module to control the pixels;
receive the sensing signals from the sensing module, and generate an object coordinate according to the sensing signals;

in response to a display instruction,
generate the display signals for an out-of-screen three-dimensional virtual input device, wherein the display signals are configured to control the first set of pixels to display the left-eye view of the three-dimensional virtual input device, and to control the second set of pixels to display the right-eye view of the three-dimensional virtual input device; and
generate a sensing instruction to indicate that the three-dimensional virtual input device is displayed;
in response to the sensing instruction, generate the first scan signals for the sensing module, and send the first scan signals to the sensing module; and
in response to the object coordinate matching coordinates of an input region of the three-dimensional virtual input device, generate an input command;
wherein the codes comprise:
a pixel control module configured to generate the display signals in response to a plurality of image signals, and send the display signals respectively to the display module to control the pixels;
an image processing module configured to generate the image signals from an image; and
a sensing control module configured to generate the first scan signals for the sensing module and send the first scan signals to the sensing module in response to the sensing instruction, receive the sensing signals from the sensing module, and generate the object coordinate by comparing to the sensing signals;
wherein when the image corresponds to the three-dimensional virtual input device, the pixel control module generates the display signals to control the first set of pixels to display the left-eye view of the three-dimensional virtual input device, and to control the second set of pixels to display the right-eye view of the three-dimensional virtual input device, and generates the sensing instruction for the sensing control module to indicate that the three-dimensional virtual input device is displayed.

2. The three-dimensional display device as claimed in claim 1, wherein the sensing module comprises a plurality of capacitive sensing units in a capacitive matrix, wherein each of the capacitive sensing units is configured to receive one of the first scan signals generated by the sensing control module, to generate the sensing signal in response to the first scan signal, and to send the sensing signal to the sensing control module.

3. The three-dimensional display device as claimed in claim 2, wherein the capacitive sensing units are capacitive sensor electrodes, and wherein each of the capacitive sensor electrodes is configured to induce a capacitance change when the object exists within a predetermined range of the capacitive sensor electrode.

4. The three-dimensional display device as claimed in claim 2, wherein the capacitive sensing units are capacitive micromachined ultrasonic transducer (CMUT) arrays, and each of the CMUT arrays comprises a plurality of CMUT units, wherein each of the CMUT arrays is configured to transmit ultrasonic waves and to receive refracted ultrasonic waves by the objects.

5. The three-dimensional display device as claimed in claim 1, wherein the virtual input device comprises an out-of-screen three-dimensional virtual keyboard.

6. The three-dimensional display device as claimed in claim 1, wherein the display signals comprise a plurality of second scan signals and a plurality of data signals.

7. The three-dimensional display device as claimed in claim 6, wherein the display module comprises:
a scan driver electrically connected to the controller, configured to receive the second scan signals from the controller;
a data driver electrically connected to the controller, configured to receive the data signals from the controller;
a plurality of scan lines electrically connected to the scan driver, each scan line configured to receive one of the second scan signals from the scan driver; and
a plurality of data lines electrically connected to the data driver, each data line configured to receive one of the data signals from the data driver;
wherein the scan lines and data lines cross over to define the plurality of pixels.

8. The three-dimensional display device as claimed in claim 1, wherein the barrier module is a parallax barrier layer, comprising a plurality of transparent units and a plurality of opaque units alternatively positioned.

9. The three-dimensional display device as claimed in claim 8, being switchable between a two-dimensional display mode and a three-dimensional display mode.

10. The three-dimensional display device as claimed in claim 9, wherein the codes comprises:
a barrier control module configured to control the opaque units of the barrier module to switch between a transparent state and an opaque state, wherein
the three-dimensional display device is switched to the two-dimensional display mode when the opaque units are switched to the transparent state; and
the three-dimensional display device is switched to the three-dimensional display mode when the opaque units are switched to the opaque state.

11. A controller, comprising:
a processor; and
a non-volatile memory storing computer executable codes, wherein the codes, when executed at the processor, are configured to
generate display signals for a display module defining a plurality of pixels in a pixel matrix, and send the display signals to the display module to control the pixels, wherein the pixels comprise a first set of pixels and a second set of pixels, and wherein a barrier module is disposed at a viewer side of the display module, wherein for a viewer at the viewer side, the barrier module is configured to allow light emitted from the first set of pixels to be viewable only by a left eye of the viewer, and allow light emitted from the second set of pixels to be viewable only by a right eye of the viewer, such that the viewer perceives the light emitted from the first set of pixels as a left-eye view and the light emitted from the second set of pixels as a right-eye view, and perceives the left-eye view and the right view to form a three-dimensional virtual image between the viewer and the display module;
receive sensing signals from a sensing module, and generate an object coordinate according to the sensing signals, wherein the sensing module is configured to receive a plurality of first scan signals, to detect an object at the viewer side of the display module in response to receiving the first scan signals, and to generate the sensing signals in response to detecting the object;
in response to a display instruction,
generate the display signals for an out-of-screen three-dimensional virtual input device, wherein the display signals are configured to control the first set of pixels to display the left-eye view of the three-dimensional virtual input device, and to control the second set of pixels to display the right-eye view of the three-dimensional virtual input device; and generate a sensing instruction to indicate that the three-dimensional virtual input device is displayed;

in response to the sensing instruction, generate the first scan signals for the sensing module, and send the first scan signals to the sensing module; and in response to the object coordinate matching coordinates of an input region of the three-dimensional virtual input device, generate an input command;

wherein the codes comprise:

a pixel control module configured to generate the display signals in response to a plurality of image signals, and send the display signals respectively to the display module to control the pixels;

an image processing module configured to generate the image signals from an image; and a sensing control module configured to generate the first scan signals for the sensing module and send the first scan signals to the sensing module in response to the sensing instruction, receive the sensing signals from the sensing module, and generate the object coordinate by comparing to the sensing signals;

wherein when the image corresponds to the three-dimensional virtual input device, the pixel control module generates the display signals to control the first set of pixels to display the left-eye view of the three-dimensional virtual input device, and to control the second set of pixels to display the right-eye view of the three-dimensional virtual input device, and generates the sensing instruction for the sensing control module to indicate that the three-dimensional virtual input device is displayed.

12. The controller as claimed in claim 11, wherein the virtual input device comprises an out-of-screen three-dimensional virtual keyboard.

13. The controller as claimed in claim 11, wherein the display signals comprise a plurality of second scan signals and a plurality of data signals.

14. The controller as claimed in claim 11, wherein the display module comprises:

a scan driver, configured to receive the second scan signals from the processor;

a data driver, configured to receive the data signals from the processor;

a plurality of scan lines electrically connected to the scan driver, each scan line configured to receive one of the second scan signals from the scan driver; and a plurality of data lines electrically connected to the data driver, each data line configured to receive one of the data signals from the data driver;

wherein the scan lines and data lines cross over to define the plurality of pixels.

15. The controller as claimed in claim 11, wherein the barrier module is a parallax barrier layer, comprising a plurality of transparent units and a plurality of opaque units alternatively positioned.

16. The controller as claimed in claim 15, wherein the codes comprise:

a barrier control module configured to control the opaque units of the barrier module to switch between a transparent state and an opaque state, wherein the display module is switched to a two-dimensional display mode when the opaque units are switched to the transparent state; and the display module is switched to a three-dimensional display mode when the opaque units are switched to the opaque state.

17. A non-transitory computer readable medium storing computer executable codes, wherein the codes, when executed at a processor, are configured to generate display signals for a display module defining a plurality of pixels in a pixel matrix, and send the display signals to the display module to control the pixels, wherein the pixels comprise a first set of pixels and a second set of pixels, and wherein a barrier module is disposed at a viewer side of the display module, wherein for a viewer at the viewer side, the barrier module is configured to allow light emitted from the first set of pixels to be viewable only by a left eye of the viewer, and allow light emitted from the second set of pixels to be viewable only by a right eye of the viewer, such that the viewer perceives the light emitted from the first set of pixels as a left-eye view and the light emitted from the second set of pixels as a right-eye view, and perceives the left-eye view and the right view to form a three-dimensional virtual image between the viewer and the display module;

receive sensing signals from a sensing module, and generate an object coordinate according to the sensing signals, wherein the sensing module is configured to receive a plurality of first scan signals, to detect an object at the viewer side of the display module in response to receiving the first scan signals, and to generate the sensing signals in response to detecting the object;

in response to a display instruction, generate the display signals for an out-of-screen three-dimensional virtual input device, wherein the display signals are configured to control the first set of pixels to display the left-eye view of the three-dimensional virtual input device, and to control the second set of pixels to display the right-eye view of the three-dimensional virtual input device; and generate a sensing instruction to indicate that the three-dimensional virtual input device is displayed;

in response to the sensing instruction, generate the first scan signals for the sensing module, and send the first scan signals to the sensing module; and in response to the object coordinate matching coordinates of a input region of the three-dimensional virtual input device, generate an input command;

wherein the codes comprise:

a pixel control module configured to generate the display signals in response to a plurality of image signals, and send the display signals respectively to the display module to control the pixels;

an image processing module configured to generate the image signals from an image; and a sensing control module configured to generate the first scan signals for the sensing module and send the first scan signals to the sensing module in response to the sensing instruction, receive the sensing signals from the sensing module, and generate the object coordinate by comparing to the sensing signals;

wherein when the image corresponds to the three-dimensional virtual input device, the pixel control module generates the display signals to control the first set of pixels to display the left-eye view of the three-dimensional virtual input device, and to control the second set of pixels to display the right-eye view of the three-dimensional virtual input device, and generates the sensing instruction for the sensing control module to indicate that the three-dimensional virtual input device is displayed.

18. The non-transitory computer readable medium as claimed in claim 17, wherein the virtual input device comprises an out-of-screen three-dimensional virtual keyboard.

19. The non-transitory computer readable medium as claimed in claim 17, wherein the display signals comprise a plurality of second scan signals and a plurality of data signals.

20. The non-transitory computer readable medium as claimed in claim 17, wherein the display module comprises:
   a scan driver, configured to receive the second scan signals from the processor;
   a data driver, configured to receive the data signals from the processor;
   a plurality of scan lines electrically connected to the scan driver, each scan line configured to receive one of the second scan signals from the scan driver; and
   a plurality of data lines electrically connected to the data driver, each data line configured to receive one of the data signals from the data driver;
   wherein the scan lines and data lines cross over to define the plurality of pixels.

21. The non-transitory computer readable medium as claimed in claim 17, wherein the barrier module is a parallax barrier layer, comprising a plurality of transparent units and a plurality of opaque units alternatively positioned.

22. The non-transitory computer readable medium as claimed in claim 21, wherein the codes comprise:
   a barrier control module configured to control the opaque units of the barrier module to switch between a transparent state and an opaque state, wherein
   the display module is switched to a two-dimensional display mode when the opaque units are switched to the transparent state; and
   the display module is switched to a three-dimensional display mode when the opaque units are switched to the opaque state.

* * * * *